(12) United States Patent
Li et al.

(10) Patent No.: US 10,993,121 B1
(45) Date of Patent: Apr. 27, 2021

(54) ESTIMATOR FOR DETERMINING UPDATES TO AN ESTIMATED LOCAL STATE VECTOR

(71) Applicant: The Boeing Company, Chicago, IL (US)

(72) Inventors: Rongsheng Li, Hacienda Heights, CA (US); Chang Jin Yoo, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/860,582

(22) Filed: Apr. 28, 2020

(51) Int. Cl.
H04W 16/18 (2009.01)

(52) U.S. Cl.
CPC .................. H04W 16/18 (2013.01)

(58) Field of Classification Search
CPC .............................. H04W 16/18; H04W 28/02
See application file for complete search history.

(56) References Cited

U.S. PATENT DOCUMENTS

| | | | | | |
|---|---|---|---|---|---|
| 6,480,152 | B2* | 11/2002 | Lin | ...................... | G01C 21/165 342/357.32 |
| 8,130,141 | B2* | 3/2012 | Pattabiraman | ............ | G01S 5/10 342/357.29 |
| 8,874,398 | B2* | 10/2014 | Raghupathy | ............ | G01S 5/021 702/94 |
| 8,917,209 | B2* | 12/2014 | Krasner | ................ | H04W 64/00 342/386 |
| 2007/0085737 | A1* | 4/2007 | Eslinger | .................. | G01S 19/48 342/357.31 |
| 2010/0324822 | A1* | 12/2010 | Coatantiec | .............. | G01S 19/20 701/472 |
| 2018/0038712 | A1* | 2/2018 | Altrichter | ............... | G01S 13/50 |

OTHER PUBLICATIONS

G. Retscher et al., Collaborative Navigation as a Solution for PNT Applications in GNSS Challenged Environments—Report on Field Trials of a Joint FIG / IAG Working Group, Journal of Applied Geodesy 2015, downloaded on Feb. 29, 2016; 9(4): 244-263, De Gruyter / TCS.

Garcia-Fernandez et al., Collaborative Navigation Simulation Tool Using Kalman Filter With Implicit Constraints,ISPRS Annals of the Photogrammetry, Remote Sensing and Spatial Information Sciences, vol. IV-2/W5, 2019 ISPRS Geospatial Week 2019, Jun. 10-14, 2019, Enschede, The Netherlands.

* cited by examiner

*Primary Examiner* — Joshua L Schwartz

(57) ABSTRACT

A communication network having a plurality of nodes is disclosed. An individual node of the communication network includes a measurement device configured to collect local measurements, an antenna configured to wirelessly connect the individual node to a collaborating node that is part of the communication network, one or more processors in electronic communication with the measurement device and the antenna, a memory coupled to the one or more processors, the memory storing data into a database and program code that, when executed by the one or more processors, causes the individual node to estimate, based on the local measurements, an estimated local state vector for the individual node. The individual node determines a collaborative update based on an estimated collaborative measurement and a collaborative residual, where the collaborative update is applied to the estimated local state vector for the individual node.

20 Claims, 12 Drawing Sheets

ESTIMATOR FOR DETERMINING UPDATES TO AN ESTIMATED LOCAL STATE VECTOR

INTRODUCTION

The present disclosure relates to an estimator for a communication network. More particularly, the present disclosure is directed towards an estimator that determines updates for an individual node based on local measurements and collaborative measurements between other nodes that are part of the communication network.

BACKGROUND

A collaborative position, navigation, and timing (PNT) system includes a group of users that are connected to one another by a wireless communication network. Each user may be a vehicle or an individual that includes PNT devices and sensors, where each user is referred to as a node. Each node that is part of the PNT system may be located in a different geographical region. As a result, some nodes may be situated in a location where global navigation satellite systems (GNSS) based signals are widely available, while other nodes may receive very limited or no signals at all. For example, a group of high-rise or tall buildings in a city, which are referred to as an urban canyon, tend to block GNSS signals. In another example, some nodes may be located in an area with a significant amount of radio frequency interference or jamming.

Some of the nodes may only be equipped with a GNSS receiver and therefore may not be able to receive signals in some situations. However, other nodes may include a combined GNSS and inertial measurement unit. Some other nodes may include celestial navigation systems or vision based navigation systems that are able to provide PNT solutions even when GNSS signals are unavailable. However, a collaborative PNT system helps alleviate some of these issues by allowing a node to leverage not only its own information, but also information that is available over the wireless network.

SUMMARY

According to several aspects, a communication network having a plurality of nodes is disclosed. An individual node of the communication network includes a measurement device configured to collect local measurements, an antenna configured to wirelessly connect the individual node to a collaborating node that is part of the communication network, one or more processors in electronic communication with the measurement device and the antenna, and a memory coupled to the one or more processors. The memory stores data into a database and program code that, when executed by the one or more processors, causes the individual node to estimate, based on the local measurements, an estimated local state vector for the individual node. The individual node predicts an estimated local measurement of the individual node on based on the estimated local state vector and the local measurements. A local residual is associated with the estimated local measurement. The individual node determines a local update based on the estimated local measurement and the local residual, where the local update is applied to the estimated local state vector for the individual node. The individual node predicts an estimated collaborative measurement based on a collaborative measurement between the individual node and the collaborative node, where a collaborative residual is associated with the estimated collaborative measurement. Finally, the individual node determines a collaborative update based on the estimated collaborative measurement and the collaborative residual, where the collaborative update is applied to the estimated local state vector for the individual node.

A method for updating an estimated local state vector of an individual node is disclosed. The method comprises estimating, based on local measurements collected by a measurement device of the individual node, an estimated local state vector for the individual node. The individual node is part of a communication network having a plurality of nodes. The method includes determining, by an estimator of the individual node, a local error covariance matrix for the estimated local state vector based on the local measurements, where the local error covariance matrix characterizes error of the estimated local state vector. The method further includes predicting, by the estimator of the individual node, an estimated local measurement of the individual node on based on the estimated local state vector and the local measurements. The method also includes determining, by the estimator of the individual node, a local residual associated with the estimated local measurement. The method includes determining, by the estimator of the individual node, a local measurement sensitivity matrix representing an amount of change that the local measurements undergo based on a corresponding change in the local state vector. The method also includes determining, by the estimator of the individual node, a local measurement variance matrix represents an uncertainty in the local measurements. The method further includes determining, by the estimator of the individual node, a local residual covariance matrix based on the local error covariance matrix and the local measurement variance matrix. The method also includes determining, by the estimator of the individual node, a local gain matrix based on the local residual covariance matrix, the local error covariance matrix, and the local measurement sensitivity matrix. The method further includes combine the local gain matrix with the local residual to create the local update. The method also includes applying the local update to the estimated local state vector of the individual node and the local residual covariance matrix. The method also includes predicting, by the estimator of the individual node, an estimated collaborative measurement based on a collaborative measurement between the individual node and a collaborative node, where the collaborating node is part of the communication network and is in wireless communication with the individual node. The method includes determining, by the estimator of the individual node, a collaborative residual associated with the estimated collaborative measurement. The method also includes determining, by the estimator of the individual node, a collaborative measurement sensitivity matrix representing an amount of change that the collaborative measurement undergoes based on a corresponding change in a local state vector of the individual node. The method includes determining, by the estimator of the individual node, a compound covariance matrix that characterizes an uncertainty in the collaborative measurement when an impact of one or more states of the collaborative node are modeled as random noise. The method also includes determining, by the estimator of the individual node, a collaborative error covariance matrix of the collaborative residual based on at least the collaborative measurement sensitivity matrix and the compound covariance matrix. The method further includes determining, by the estimator of the individual node, a collaborative gain matrix based on the collaborative error covariance matrix of the collaborative residual. Finally, the method includes combining the collaborative gain matrix with the collaborative residual to create a collaborative update.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards an estimator that determines corrections or updates that are applied to an estimated local state vector for an individual node. The updates are based on local measurements as well as collaborative measurements between the individual node and a collaborative node. The present disclosure describes two different approaches for updating the estimated local state vector for an individual node. In the first example, the individual node includes its own estimator, and the estimated local state vector is updated based on the local measurements as well as a collaborative measurement between the individual node and the collaborative node. This decentralized approach is referred to as a local with immediate neighbor (LWIN) approach. In a second approach, a portion of the local updates for each node are performed locally, while the collaborative updates for each pair of collaborating nodes are performed at a centralized portion of the estimator. This is a more centralized approach and therefore is referred to as an integrated total network solution (ITNS) approach. Both approaches improve the accuracy of the estimated local state vector for each node, since the updates are based on not only the local measurements, but also collaborative measurements between nodes.

The following description is merely exemplary in nature and is not intended to limit the present disclosure, application, or uses.

Figure 1:
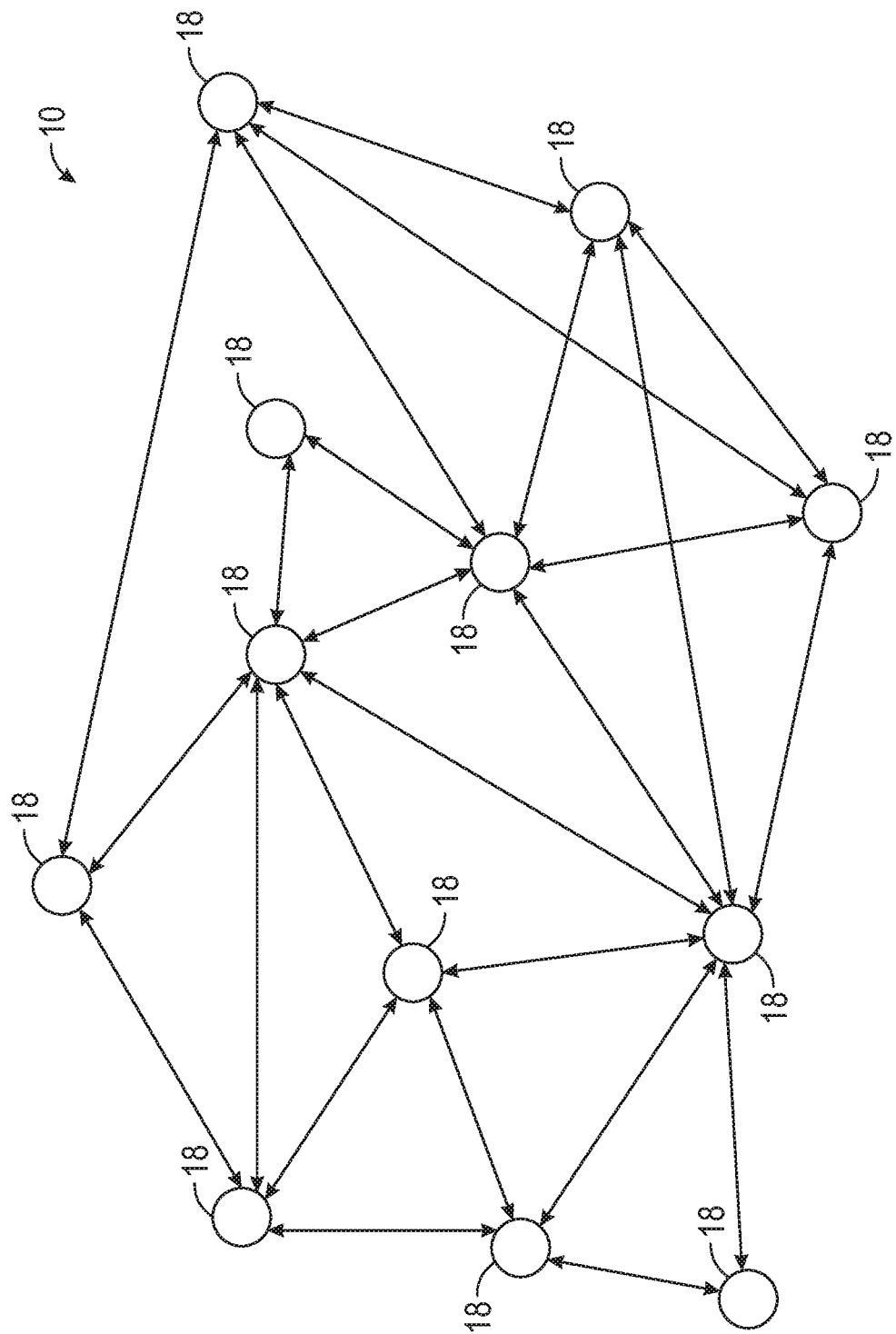
FIG. 1 is a schematic diagram of the disclosed communication network having a plurality of nodes that are in wireless communication with one another, according to an exemplary embodiment.

Referring to FIG. 1, an exemplary communication network 10 having a plurality of nodes 18 is illustrated. The nodes 18 are in wireless communication with one another by network connections 20. Each node 18 that is part of the communication network 10 is configured to collect local measurements and collaborative measurements that are measured between two collaborating nodes 18. Some examples of the local measurements and the collaborative measurements include, but are not limited to, time transfer and synchronization, three-dimensional images, range measurements between nodes 18, line-of-sight (LOS) measurements between nodes 18, angle of arrival (AOA) measurements between nodes 18, or direction of arrival (DOA) between nodes 18. The nodes 18 represent any device configured to estimate a local state vector such as, for example, a machine, a vehicle, or an individual such as a soldier. For example, in one embodiment, the nodes 18 may each represent a machine, where the nodes 18 are located in a manufacturing facility. As explained below and shown in FIG. 4, in another embodiment the nodes 18 each represent users that are part of collaborative positioning, navigation, and timing (PNT) network 26.

Figure 2:
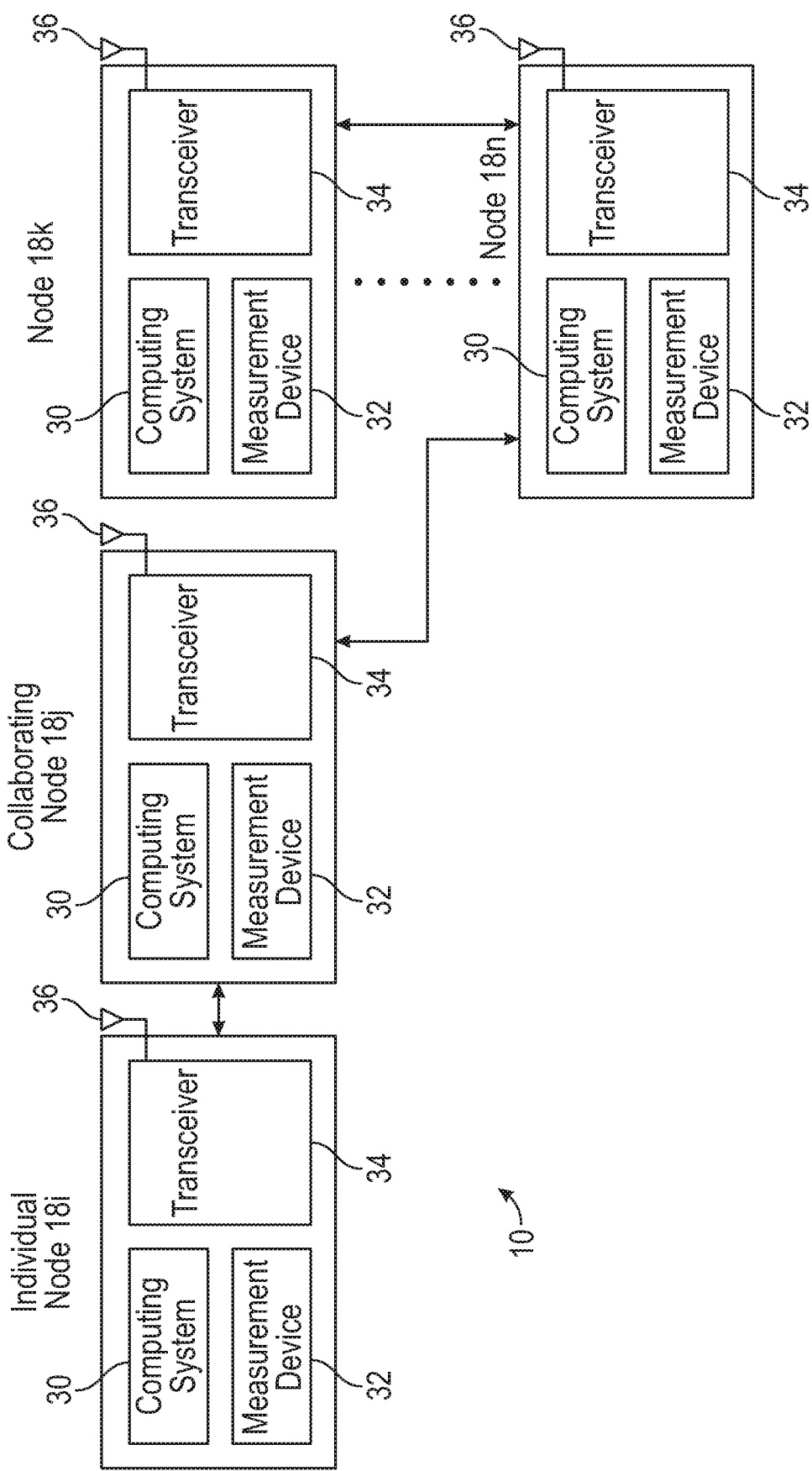
FIG. 2 is a schematic diagram of the communication network according to a local with immediate neighbor (LWIN) approach for updating an estimated state vector of an individual node, according to an exemplary embodiment.
Figure 3:
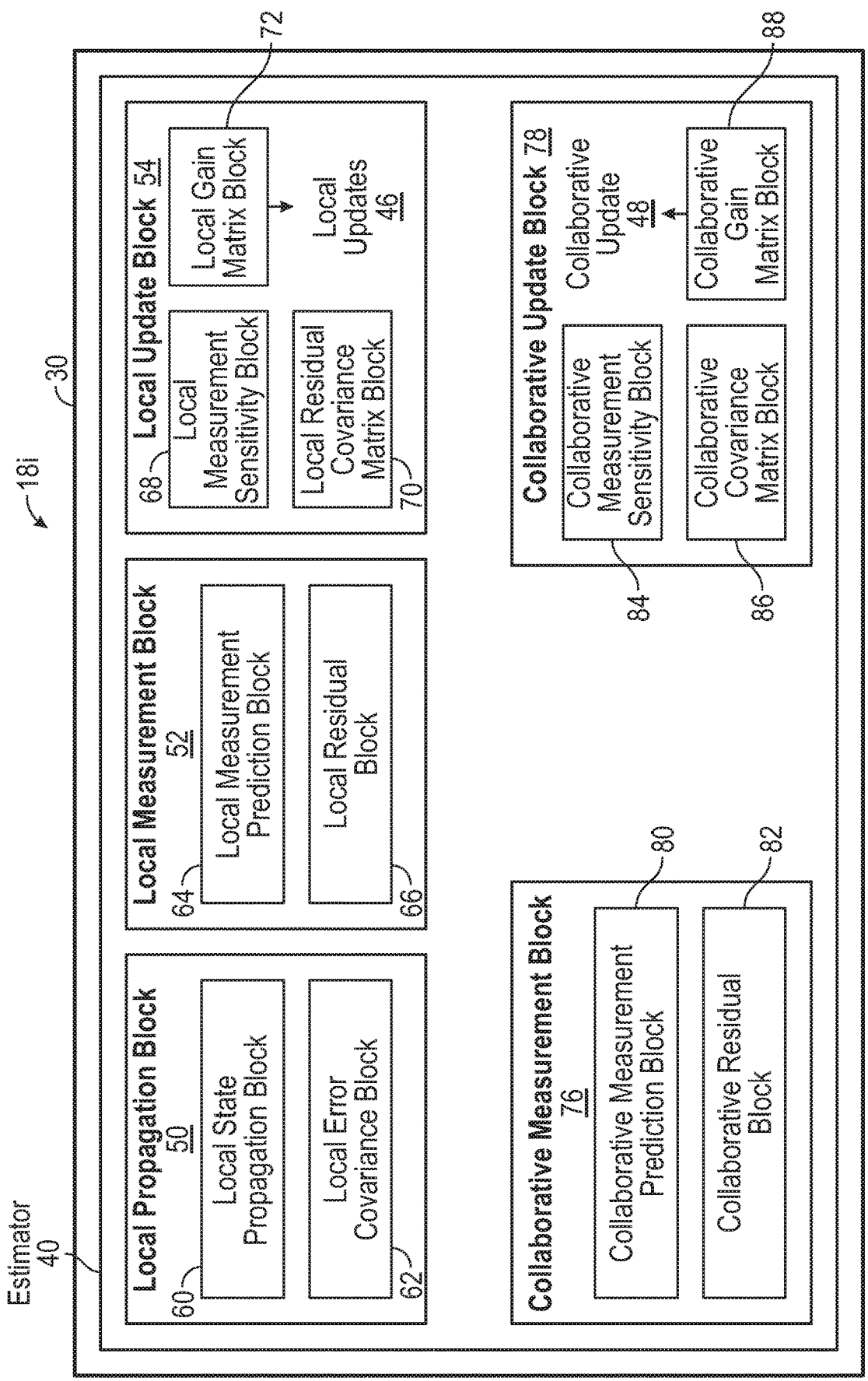
FIG. 3 is a schematic diagram of an individual node that updates the estimated state vector based on local measurements as well as collaborative measurements based on the LWIN approach, according to an exemplary embodiment.
Figure 7:
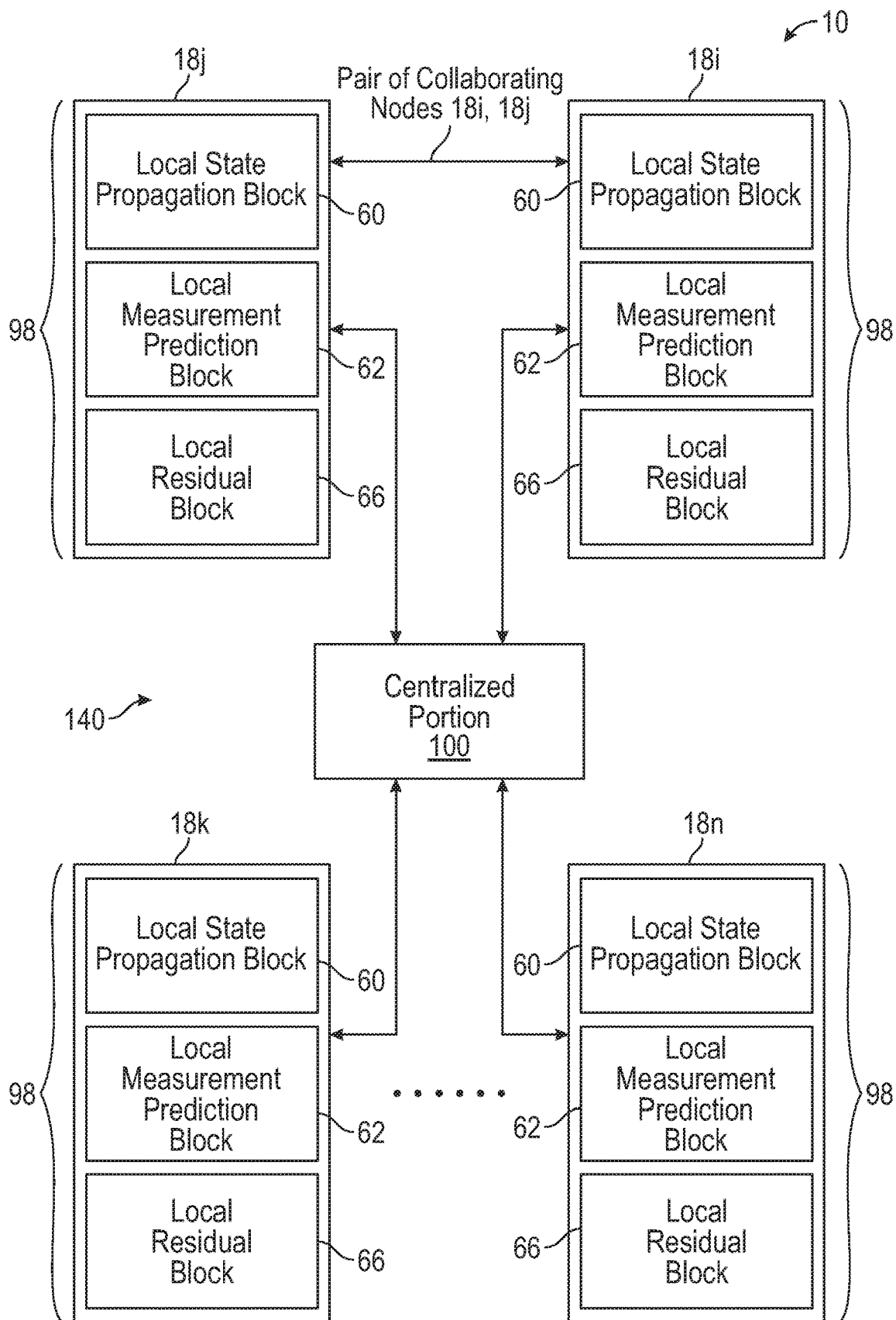
FIG. 7 is a schematic diagram of the communication network according to an integrated total network solution (ITNS) approach for updating the estimated state vector, according to an exemplary embodiment.
Figure 8:
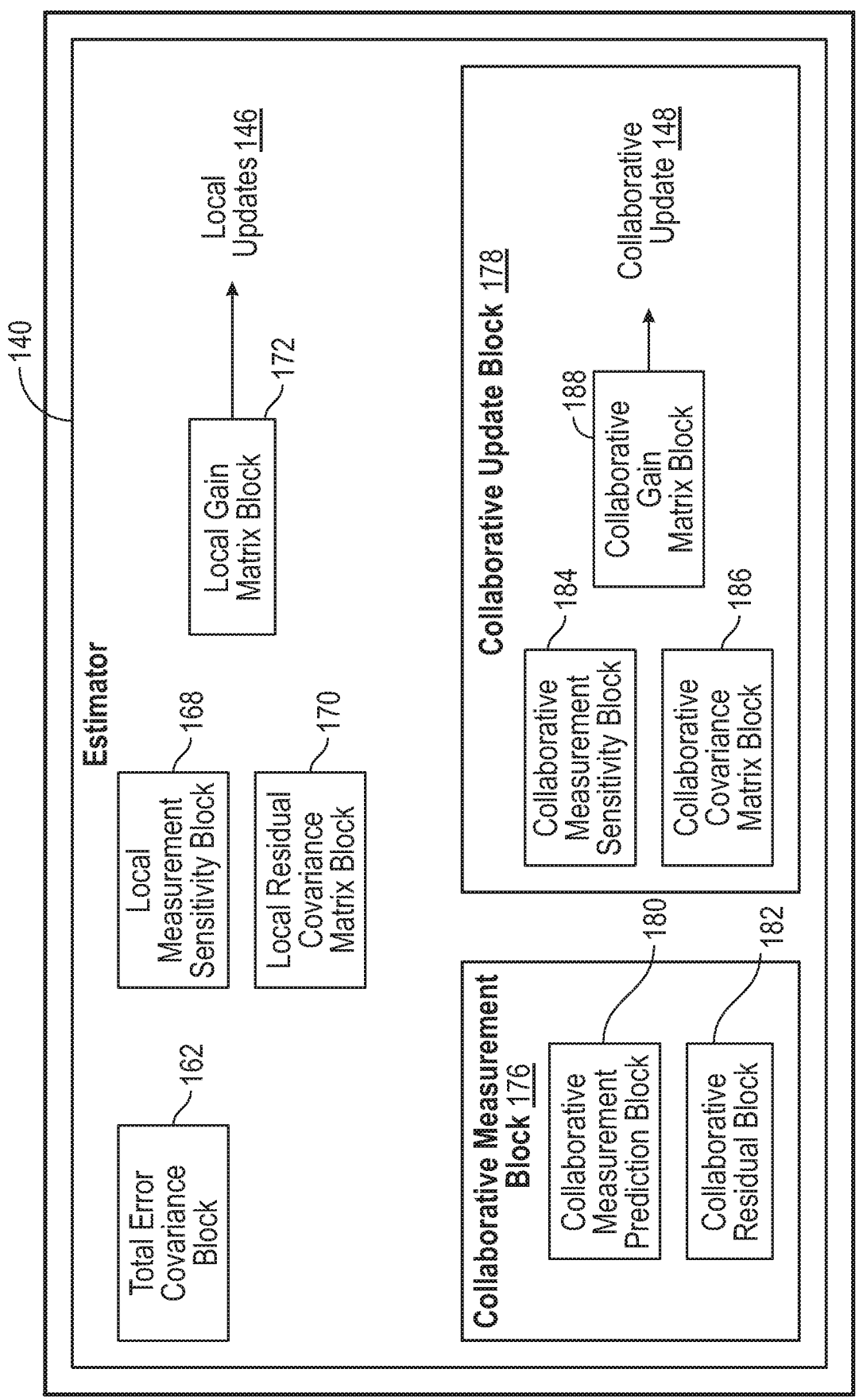
FIG. 8 is a schematic diagram of a centralized portion of an estimator shown in FIG. 7 that determines the local updates for each node that is part of the communication network and collaborative updates, according to an exemplary embodiment.

Referring to FIGS. 2 and 3, in one approach an individual node 18$i$ includes an estimator 40 that determines updates to an estimated local state vector. The updates are determined based on the local measurements as well as collaborative measurements that are measured between the individual node 18$i$ and a collaborating node 18$j$. This approach is referred to as a local with immediate neighbor (LWIN) approach because all of the calculations are performed locally at the individual node 18$i$. Alternatively, in the embodiment as shown in FIGS. 7 and 8, the communication network 10 includes a distributed approach. Specifically, this approach includes an estimator 140 that is distributed throughout the communication network 10. Specifically, a portion 98 of the estimator 140 is located locally at each node 18 that is part of the communication network 10 and determines some of the local updates. A centralized portion 100 of the estimator 140 determines a remaining portion of the local updates for each node 18 that is part of the communication network 10 as well collaborative updates based on the collaborative measurements between two collaborating nodes 18. This approach is referred to as an integrated total network solution (ITNS) because some of the calculations are performed at the centralized portion 100 of the estimator 140.

Turning back to FIG. 2, in the LWIN approach each node 18 is in wireless communication with at least one other neighboring node 18 that is part of the communication network 10. For purposes of the present disclosure, a neighboring node 18 refers to a logical or topographical relationship between two nodes 18. Furthermore, although FIG. 2 illustrates node 18i and node 18j, node 18k and node 18n, and node 18j and node 18n in electronic communication with one another, it is to be appreciated that each node 18 may be in communication with all of the remaining nodes 18 that are part of the communication network 10. Specifically, if there are n number of nodes that are part of the communication network 10, then each node 18 may be in wireless communication with up to n-1 number of nodes.

Each node 18 includes a computing system 30, a measurement device 32, a transceiver 34, and an antenna 36, where the nodes 18 are in wireless communication with one another by their respective antennas 36. The computing system 30 is in electronic communication with the measurement device 32, the transceiver 34, and the antenna 36. The measurement device 32 represents any device or combination of devices configured to collect the local measurements and the collaborative measurements for a respective node 18. For example, in one embodiment, if the local measurements are three-dimensional images, then the measurement device 32 includes one or more cameras. In another embodiment, the measurement device 32 is a PNT system that determines a position of the respective node 18 in a frame of reference of the Earth. It is to be appreciated that the PNT system is not limited to a specific type of system. For example, some nodes 18 that are part of the communication network 10 may include only a global navigation satellite systems (GNSS) receiver as the PNT system. However, other nodes 18 may include a GNSS receiver combined with an inertial measurement unit as the PNT system. Alternatively, in another approach, some nodes 18 may include a vision based navigation system or a celestial navigation system as the PNT system.

FIG. 3 is a schematic diagram of the computing system 30 of the individual node 18i shown in FIG. 2 including the estimator 40, which is configured to determine local updates 46 based on the local measurements that are collected from the measurement device 32 (FIG. 2) of the individual node 18i. The local measurements represent information that is based on only the individual node 18i. The estimator 40 is also configured to determine collaborative updates 48 based on collaborative measurements between the individual node 18i and the collaborative node 18j (as shown in FIG. 2). The collaborative measurements between the individual node 18i and the collaborative node 18j are measured with respect to the individual node 18i.

The estimator 40 includes a local state propagation block 50, a local measurement block 52, and a local update block 54 for determining the local update 46. The local state propagation block 50 determines a plurality of local state propagators. The plurality of local state propagators include an estimated local state vector for the individual node 18i and a local error covariance matrix of the estimated local state vector. The local state propagation block 50 receives as input a local state vector $x_i(k)$, a deterministic input vector $u_i(k)$, and a local measurement vector $z_i(k)$, where k represents a specific point in time. The local state vector $x_i(k)$, the deterministic input vector $u_i(k)$, and the local measurement vector z (k) are based on the local measurements collected from the measurement device 32 of the individual node 18i (FIG. 2).

The local state propagation block 50 includes a local state propagation block 60 and a local error covariance block 62. The local state propagation block 60 estimates the estimated local state vector for the individual node 18i based on the local state vector $x_i(k)$ and the deterministic input vector $u_i(k)$ according to Equation 1, which is as follows:

$$\hat{x}_i(k|k-1) = f_i(\hat{x}_i(k-1|k-1), u_i(k-1), k-1)) \quad \text{Equation 1}$$

where $\hat{x}_i(k|k-1)$ is the estimated local state vector for the individual node 18i up to a point in time of (k-1), and $f_i$ represents a function that models a dynamic behavior of the communication network 10 (FIG. 1) at the individual node 18i.

The local error covariance block 62 determines the local error covariance matrix for the estimated local state vector $\hat{x}_i(k|k-1)$. The local error covariance matrix characterizes error of the estimated local state vector $\hat{x}_i(k|k-1)$. The local error covariance matrix is determined based on the local measurements and the estimated local state vector $\hat{x}_i(k|k-1)$, and is expressed in Equation 2:

$$P_i(k|k-1) = \Phi_i(k-1) P_i(k-1|k-1) \Phi_i^T(k-1) + Q_i(k) \quad \text{Equation 2}$$

where $P_i(k|k-1)$ is the local error covariance matrix when the time is equal to (k-1) based on measurements up to the point of (k-1), $P_i(k-1|k-1)$ is the covariance matrix for the individual node 18i when the time is equal to k based on measurements up to the point of (k-1), $\Phi_i$ is a state transition matrix for the node 18i, $\Phi_i^T$ represents a transposed state transition matrix, and $Q_i(k)$ is a process noise covariance matrix for the node 18i. It is to be appreciated that the state transition matrix $\Phi_i$ and the process noise covariance matrix $Q_i(k)$ are both block-diagonal matrices, which may result in reduced computation.

The local measurement block 52 predicts an estimated local measurement $\hat{z}_i(k|k-1)$ of the individual node 18i and a local residual $\mu_i$. Specifically, the local measurement block 52 includes a local measurement prediction block 64 that predicts an estimated local measurement $\hat{z}_i(k|k-1)$ of the individual node 18i based on the estimate of the local state vector $\hat{x}_i(k|k-1)$ for the individual node 18i, the local measurement vector $\hat{z}_i(k)$, and the deterministic input vector $u_i(k)$ according to Equation 3, which is as follows:

$$\hat{z}_i(k|k-1) = g_i(\hat{x}_i(k|k-1), u_i(k-1), k) \quad \text{Equation 3}$$

where $g_i$ denotes a function that represents a local measurement model at the individual node 18i. The local residual $\mu_i$ is associated with the estimated local measurement $\hat{z}_i(k|k-1)$ of the individual node 18i. Specifically, the local measurement block 52 includes a local residual block 66 that determines the local residual $\mu_i$ for the individual node 18i based on a difference between the local measurement vector $z_i(k)$ and the estimated local measurement $\hat{z}_i(k|k-1)$, and is expressed in Equation 4 as:

$$\mu_i = (z_i(k) - \hat{z}_i(k|k-1)) \quad \text{Equation 4}$$

The local update block 54 includes a local measurement sensitivity block 68, a local residual covariance matrix block 70, and a local gain matrix block 72. The local update block 54 determines the local update 46 that is applied to the estimated local state vector $\hat{x}_i(k|k-1)$ and the local covariance matrix $P_i(k|k-1)$ for the individual node 18i. Specifically, the local measurement sensitivity block 68 first determines a local measurement sensitivity matrix $H_{zi}(k)$ as well as a local measurement variance matrix $R_{zi}(k)$. The local measurement sensitivity matrix $R_{zi}(k)$ represents an amount of change that the local measurements undergo based on a change in the local state vector $x_i(k)$. The local measurement variance matrix $R_{zi}(k)$ represents an uncertainty in the local measurements, where the uncertainty may also be referred to as the error. The local measurement sensitivity matrix $H_{zi}(k)$ is expressed in Equation 5 as:

$$H_{zi}(k) \triangleq \frac{\partial g_i}{\partial x_i}\bigg|_{x_i = \hat{x}_i(k|k-1)} \quad \text{Equation 5}$$

where $$\frac{\partial g_i}{\partial x_i}\bigg|_{x_i = \hat{x}_i(k|k-1)}$$

represents a partial derivative of the local state vector $x_i(k)$. It is to be appreciated that both the local measurement sensitivity matrix $H_{zi}(k)$ as well as the local measurement variance matrix $R_{zi}(k)$ are block-diagonal, which simplifies computation. The local residual covariance matrix block 70 determines a local residual covariance matrix $P_{\mu_i}$ that represents an uncertainty of the $\mu_i$ for the individual node 18i. The residual covariance matrix $P_{\mu_i}$ of the local residual $\mu_i$ is determined based on the local error covariance matrix $P_i(k|k-1)$ and the local measurement variance matrix $R_{zi}(k)$, and is expressed in Equation 6 as:

$$P_{\mu_i} = \left(\frac{\partial g_i}{\partial x_i}\right) P_i \left(\frac{\partial g_i}{\partial x_i}\right)^T + R_{zi} \quad \text{Equation 6}$$

where $$\left(\frac{\partial g_i}{\partial x_i}\right)$$

represents a partial mapping matrix. The local gain matrix block 72 determines a local gain matrix $K_{zi}(k)$ based on the covariance matrix $P_{\mu_i}$, the local error covariance matrix $P_i(k|k-1)$, and the local measurement sensitivity matrix $H_{zi}(k)$, which is expressed in Equation 7 as:

$$K_{zi} = P_i(k|k-1)H_{zi}^T(k)B_{\mu i} \quad \text{Equation 7}$$

where an inverse $P_{\mu i}^{-1}$ of the covariance matrix $P_{\mu_i}$ is expressed as $B_{\mu i}$. The local gain matrix $K_{zi}(k)$ is combined with the local residual $\mu_i$ to create the local update 46. Specifically, the local update 46 is a product of local gain matrix $K_{zi}(k)$ and the local residual $\mu_i$. The local update 46 is applied to the local state propagation block 60 and the local residual covariance matrix block 70. Specifically, the local state propagation block 60 adds the local update 46 to the estimated local state vector $\hat{x}_i(k|k-1)$ to determine an updated estimated local state vector $\hat{x}_i(k|k)$, which is expressed in Equation 8 as:

$$\hat{x}_i(k|k) = \hat{x}_i(k|k-1) + K_{zi}\mu_i(k) \quad \text{Equation 8}$$

The local update 46 is also applied to the local residual covariance matrix $P_{\mu_i}$. Specifically, the local residual covariance matrix block 70 adds the local update 46 to the local residual covariance matrix $P_{\mu_i}$ to determine an updated residual covariance matrix $P_i(k|k)$, which is expressed in Equation 9 as:

$$P_i(k|k) = (I - K_{zi}(k)H_{zi}(k))P_i(k|k-1) \quad \text{Equation 9}$$

where I represents the identity matrix.

The collaborative updates 48 for the individual node 18i are now described. It is to be appreciated that the estimator 40 may determine the collaborative updates 48 either immediately after the local error covariance block 62 determines the local error covariance matrix $P_i(k|k-1)$ for the individual node 18i or, alternatively, immediately after the local gain matrix block 72 determines the local gain matrix $K_{zi}(k)$. However, if the estimator 40 determines the collaborative updates 48 after the local updates 46, then the covariance matrix $P_{\mu_i}$ is first updated, and then the estimator 40 may determine the collaborative measurement.

The estimator 40 includes a collaborative measurement block 76 and a collaborative update block 78 for determining the collaborative update 48. The collaborative measurement block 76 includes a collaborative measurement prediction block 80 and a collaborative residual block 82. As explained below, the collaborative measurement prediction block 80 predicts an estimated collaborative measurement $\hat{y}_{ij}(k|k-1)$ based on the collaborative measurement between the individual node 18i and the collaborative node 18j. It is to be appreciated that the collaborative measurement between the individual node 18i and the collaborative node 18j is measured with respect to the individual node 18i. The collaborative node 18j may send its local measurements to the individual node 18i over the communication network 10 (FIG. 1) or, alternatively, the measurement device 32 of the individual node 18i may collect local measurements of the collaborative node 18j.

The collaborative measurement prediction block 80 predicts the estimated collaborative measurement $\hat{y}_{ij}(k|k-1)$ based on a collaborative measurement vector $y_{ij}(k)$, the local state vector $x_i(k)$ of the individual node 18i, and a local state vector $y_j(k)$ of the collaborative node 18j, and is expressed by Equation 10 as:

$$\hat{y}_{ij}(k|k-1) = h_{ij}(\hat{x}_i(k|k-1), \hat{x}_j(k|k-1), k) \quad \text{Equation 10}$$

where $h_{ij}$ represents a function that models the collaborative measurement at the individual node 18i as measured by the collaborative node 18i through the collaboration of node 18i with node 18j. The collaborative measurement vector $y_{ij}(k)$ represents the collaborative measurement between the individual node 18i and the collaborative node 18j.

A collaborative residual $\upsilon$ is associated with the estimated collaborative measurement $\hat{y}_{ij}(k|k-1)$. Specifically, the collaborative residual block 82 determines the collaborative residual $\upsilon$. The collaborative residual $\upsilon$ represents a difference between the collaborative measurement vector $y_{ij}(k)$ and the estimated collaborative measurement $\hat{y}_{ij}(k|k-1)$, and is determined according to Equation 11 as:

$$\upsilon = (y_{ij}(k) - \hat{y}_{ij}(k|k-1)) \quad \text{Equation 11}$$

The collaborative update block 78 includes a collaborative measurement sensitivity block 84, a collaborative covariance matrix block 86, and a collaborative gain matrix block 88. The collaborative measurement sensitivity block 84 determines a collaborative measurement sensitivity matrix $H_{yij}(k)$ and a compound covariance matrix $\overline{R}_{yij}(k)$. The collaborative measurement sensitivity matrix $H_{yij}(k)$ represents an amount of change that the collaborative measurement undergoes based on a corresponding change in the local state vector $x_i(k)$ of the individual node 18i. The compound covariance matrix $\overline{R}_{yij}(k)$ characterizes an uncertainty in the collaborative measurement when an impact of one or more state of the collaborative node 18j are modeled as random noise. The collaborative measurement sensitivity matrix $H_{yij}(k)$ is determined based on the estimated collaborative measurement $\hat{y}_{ij}(k|k-1)$, which is expressed in Equation 12 as:

$$H_{yij}(k) = \begin{bmatrix} \ldots & 0 & \frac{\partial h_i}{\partial x_i} & 0 & \ldots \end{bmatrix} \quad \text{Equation 12}$$

The collaborative measurement sensitivity block 84 also determines the compound covariance matrix $\overline{R}_{yij}(k)$ based on the collaborative measurement variance matrix $$R_{yij}(k), \left(\frac{\partial h_j}{\partial x_i}\right)$$

represents an uncertainty of the state, and $$P_j(k|k-1)\left(\frac{\partial h_j}{\partial x_i}\right)^T$$

represents an uncertainty of the noise, and is expressed in Equation 13 as:

$$\overline{R}_{yij}(k) = R_{yij}(k) + \left(\frac{\partial h_j}{\partial x_i}\right) P_j(k|k-1)\left(\frac{\partial h_j}{\partial x_i}\right)^T \quad \text{Equation 13}$$

The collaborative covariance matrix block 86 determines a collaborative error covariance matrix $P_{\upsilon ij}$ of the collaborative residual $\upsilon$. The collaborative error covariance matrix $P_{\upsilon ij}$ is determined based on the collaborative measurement sensitivity matrix $H_{yij}(k)$, the collaborative measurement variance matrix $R_{yij}(k)$, the compound covariance matrix $\overline{R}_{yij}(k)$, a collaborative error covariance matrix $P_{ii}(k|k-1)$ of the individual node 18i, and a collaborative error covariance matrix $P_{\upsilon ij}(k|k-1)$ of the collaborative node 18j, and is expressed in Equation 14 as $$P_{\upsilon ij} = (H_{yi}(k)P_{ii}(k|k-1)H_{yi}^T(k) + H_{yj}(k)P_{jj}(k|k-1)H_{yj}^T(k) + \overline{R}_{yij}(k)) \quad \text{Equation 14}$$

The collaborative gain matrix block 88 determines a collaborative gain matrix $K_{yij}(k)$ based on the covariance matrix $P_{\upsilon ij}$ of the collaborative residual $\upsilon$, a collaborative error covariance matrix $P_{ii}(k|k-1)$, and the collaborative measurement sensitivity matrix $H_{yij}(k)$, which is expressed in Equation 15 as:

$$K_{yij}(k) = P_{ii}(k|k-1)H_{yij}^T(k)B_{\upsilon ij} \quad \text{Equation 15}$$

where an inverse $P_{\upsilon ij}^{-1}$ of the collaborative covariance matrix $P_{\upsilon ij}$ is expressed as $B_{\upsilon ij}$. The collaborative gain matrix $K_{yij}(k)$ is combined with the collaborative residual $\upsilon$ to create the collaborative update 48. Specifically, the collaborative update 48 is a product of the collaborative gain matrix $K_{yij}(k)$ and the collaborative residual $\upsilon$. The local state propagation block 60 then applies the collaborative update 48 to the estimated local state vector $\hat{x}_i(k|k-1)$. Specifically, the local state propagation block 60 adds the collaborative update 48 to the to the estimated local state vector $\hat{x}_i(k|k-1)$ to determine the updated estimated local state vector $\hat{x}_i(k|k)$, which is expressed in Equation 16 as:

$$\hat{x}_i(k|k) = \hat{x}_i(k|k-1) + K_{yij}\upsilon \quad \text{Equation 16}$$

The local residual covariance matrix block 70 determines the updated residual covariance matrix $P_i(k|k)$ based on the local update 46, which is expressed in Equation 17 as:

$$P_i(k|k) = (1 - K_{yij}(k)H_{yij}(k))P_i(k|k-1) \quad \text{Equation 17}$$

It is to be appreciated that the estimators for the compound covariance matrix $\overline{R}_{yij}(k)$ are decoupled. In other words, each node 18i, 18j is associated with a unique state vector. It is also to be appreciated that an estimation error of the collaborative node 18j is modeled as noise. Specifically, the collaborative measurement vector $y_{ij}(k)$ is expressed in Equation 18 as:

$$y_{ij}(k) = h_{ij}(x_i(k), x_j(k), k) + s_{ij}(k) \quad \text{Equation 18}$$

where $s_{ij}(k)$ represents a random measurement noise vector for the individual node 18i at time k when collaborating with the collaborative node 18j. Finally, it is to be appreciated that the collaborative measurement vector $y_{ij}(k)$ is the only measurement that is not locally independent. In other words, all of the remaining measurements described above are local measurements that are specific to either the individual node 18i or the collaborative node 18j.

Figure 4:
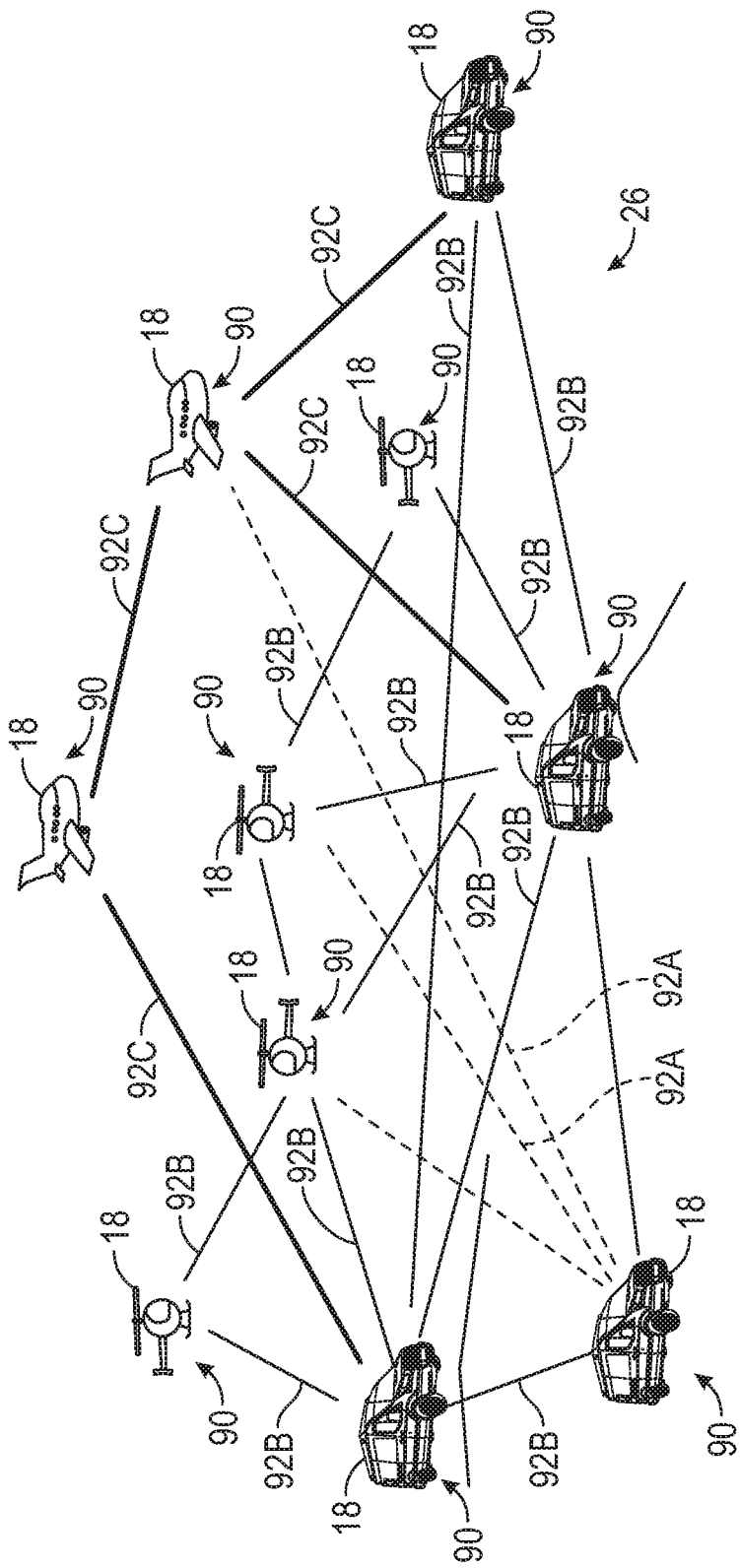
FIG. 4 illustrates a collaborative positioning, navigation, and timing (PNT) system, according to an exemplary embodiment.

FIG. 4 is an exemplary illustration of the PNT network 26, where each node 18 represents a user. In the exemplary embodiment as shown in FIG. 4, the nodes 18 represent a land vehicle, helicopter, or an aircraft. However, it is to be appreciated that the nodes 18 may also represent individuals as well. For example, in one embodiment, one or more nodes 18 represent an individual such as a soldier holding a PNT system. Referring to both FIGS. 2 and 4, the measurement device 32 for each node 18 of the PNT network 26 is a PNT system that determines a position 90 of the respective node 18 in a frame of reference of the Earth. One example of a frame of reference of the Earth is an Earth-centered, Earth-fixed (ECEF) frame of reference. Alternatively, in another embodiment, the latitude, longitude, and altitude may be used instead. In the embodiment as shown, the dashed lines between the nodes 18 represent a wireless communication connection 92A. The thin solid lines between the nodes 18 represent a wireless communication connection 92B that includes time-transfer and range measurements. The thick solid lines between the nodes 18 represent a wireless communication connection 92C that includes time-transfer, range measurements, and (LOS) line-of-sight measurements.

Figure 5A:
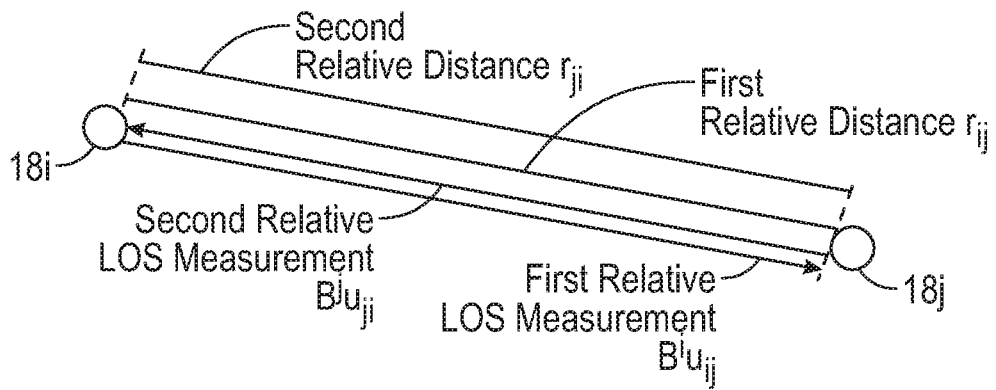
FIG. 5A illustrates one example of a collaborative measurement between the individual node and a collaborative node that includes relative distance measurements combined with relative line-of-sight (LOS) measurements, according to an exemplary embodiment.
Figure 5B:
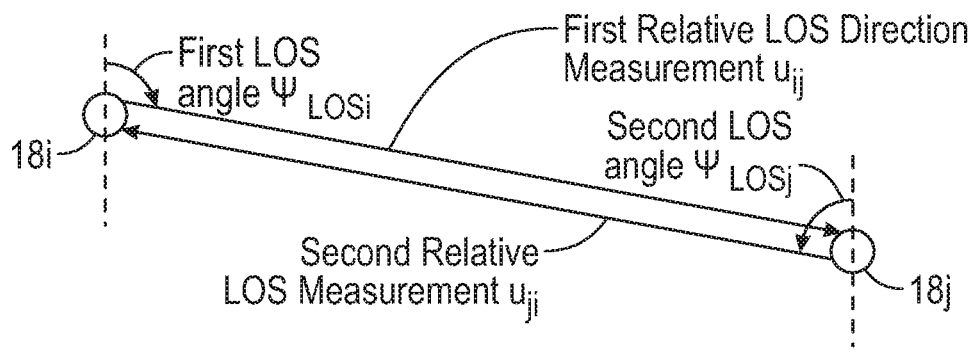
FIG. 5B illustrates another example of a collaborative measurement between the individual node and the collaborative node that includes a relative LOS direction measurement, according to an exemplary embodiment.
Figure 5C:
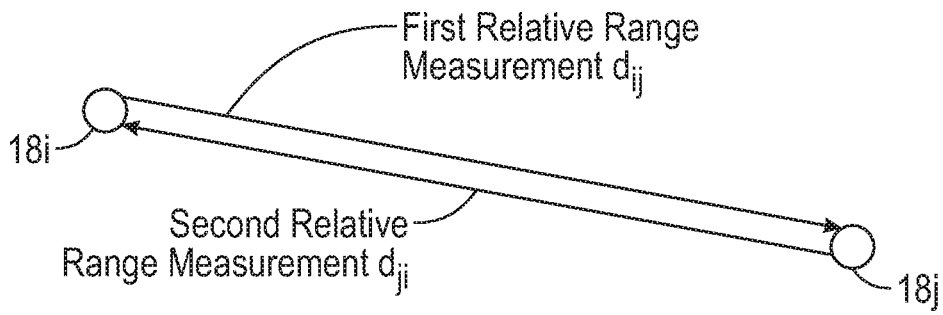
FIG. 5C illustrates yet another example of a collaborative measurement between the individual node and the collaborative node including a relative range measurement, according to an exemplary embodiment.

FIGS. 5A-5C illustrates exemplary collaborative measurements based on the PNT network 26 shown in FIG. 4. In the embodiment as shown in FIG. 5A, the collaborative measurement between the individual node 18i and the collaborative node 18j includes relative distance measurements between the individual node 18i and the collaborative node 18j combined with relative LOS measurements between the individual node 18i and the collaborative node 18j. As seen in FIG. 5A, the relative distance measurements are represented by a first relative distance $r_{ij}$ measured between the individual node 18i and the collaborative node 18j as measured by individual node 18i, and a second relative distance $r_{ji}$ measured between the individual node 18i and the collaborative node 18j as measured by the collaborative node 18j. The relative LOS measurements include a first relative LOS measurement $^B\mathrm{u}_{ij}$ as measured by the individual node 18i is represented by a first unit vector pointing from the individual node 18i to the collaborative node 18*j*, where the superscript $B_i$ indicates a body frame of the individual node 18*i*. The relative LOS measurements further include a second relative LOS measurement $^{B_j}u_{ji}$ as measured by the collaborative node 18*j* is represented by a second unit vector pointing from the collaborative node 18*j* to the individual node 18*i*, where the superscript $B_1$ indicates a body frame of the collaborative node 18*j*.

Equation 19 expresses a position $^E R_i$ of the individual node 18*i* in the ECEF frame of reference, and Equation 20 expresses a position $^E R_j$ of the collaborative node 18*j* in the ECEF frame of reference:

$$^E R_j - {}^E R_i = B_{B_i}{}^E (r_{ij}{}^{B_i} u_{ij}) \qquad \text{Equation 19}$$

$$^E R_i - {}^E R_j = C_{B_j}{}^E (r_{ji}{}^{B_j} u_{ji}) \qquad \text{Equation 20}$$

where $C_{B_i}{}^E$ represents a directional cosine matrix for transforming a vector from the body frame of reference of the individual node 18*i* into the ECEF frame of reference, and $C_{B_j}{}^E$ represents a directional cosine matrix for transforming a vector from the body frame of reference of the collaborative node 18*j* into the ECEF frame of reference. It is to be appreciated that the collaborative measurements between the individual node 18*i* and the collaborative node 18*j* for the LWIN approach are node-centric. In other words, the collaborative measurement between the individual node 18*i* and the collaborative node 18*j* is measured with respect to either the individual node 18*i* or the collaborative node 18*j*.

In another embodiment as shown in FIG. 5B, the collaborative measurement between the individual node 18*i* and the collaborative node 18*j* is a relative LOS direction measurement that indicates an angular measurement as measured with respect to either the individual node 18*i* or the collaborative node 18*j*. In one example, the collaborative measurement is node-centric to the individual node 18*i* and include the position $^E R_i$ of the individual node 18*i*, an attitude $r^{Bi}$ of the individual node 18*i* in the body frame of reference, a first relative LOS direction measurement $u_{ij}$, and a first LOS angle $\Psi_{LOSi}$. It is to be appreciated that two LOS angles are involved with these measurements, however, only a single angle is shown for purposes of simplicity. The first relative LOS direction measurement $u_{ij}$ is measured between the individual node 18*i* and the collaborative node 18*j* with respect to the individual node 18*i*, and the first LOS angle $\Psi_{LOSi}$ is measured with respect to the individual node 18*i* and the first relative LOS direction measurement $u_{ij}$. Equation 21 may be used to determine the attitude $r^{Bi}$ and the position $^E R_i$ of the individual node 18*i*, and is expressed as:

$$z_{iij} = r^{B_i} u_{ij} = C_E^{B_i}({}^E R_j - {}^E R_i) + v_{iij} \qquad \text{Equation 21}$$

where $z_{iij}$ represents a measurement for the individual node 18*i*, as measured by the individual node 18*i*, through a collaboration between the individual node 18*i* and the collaborative node 18*j* and $v_{iij}$ represents all measurement noise. In another example, instead of node-centric measurements, the position $^E R_j$ of the collaborative node 18*j*, an attitude $r^{Bj}$ of the collaborative node 18*j* in the body frame of reference, and a second relative LOS direction measurement $u_{ji}$ is used instead. The second relative LOS direction measurement $u_{ji}$ is measured between the individual node 18*i* and the collaborative node 18*j* with respect to the collaborative node 18*j*, a second LOS angle $\Psi_{LOSj}$ is measured with respect to the collaborative node 18*j* and the second relative LOS direction measurement $u_{ji}$. The position $^E R_j$ of the collaborative node 18*j*, the attitude $r^{Bj}$ of the collaborative node 18*j*, and the second relative LOS direction measurement $u_{ji}$ are communicated to the individual node 18*i* over the communication network 10 (FIG. 1). Equation 22 may be used to determine the attitude $r^{Bi}$ and the position $^E R_i$ of the individual node 18*i*, and is expressed as:

$$z_{iji} = r^{B_j} u_{ji} + C_E^{B_j} {}^E R_j = C_E^{B_j E} R_i + v_{iji} \qquad \text{Equation 22}$$

where $z_{iji}$ represents a measurement for the individual node 18*i*, as measured by the collaborative node 18*j*, through a collaboration between the collaborative node 18*j* and the individual node 18*i*, and $v_{iji}$ represents all measurement noise.

In yet another embodiment as shown in FIG. 5C, the collaborative measurement between the individual node 18*i* and the collaborative node 18*j* is a relative range measurement between the individual node 18*i* and the collaborative node 18*j*, which is measured with respect to either the individual node 18*i* or the collaborative node 18*j*. Specifically, FIG. 5C illustrates a first relative range measurement $d_{ij}$ measured between the individual node 18*i* and the collaborative node 18*j* as measured with respect to the individual node 18*i* and a second relative range measurement $d_{ji}$ measured between the individual node 18*i* and the collaborative node 18*j* as measured with respect to the collaborative node 18*j*. In one example, the first relative range measurement $d_{ij}$ measured between the individual node 18*i* and the collaborative node 18*j* as measured with respect to the individual node 18*i* is expressed in Equation 23 as:

$$d_{ij} = \| {}^E R_i - {}^E R_j \| \pm v_{ij} \qquad \text{Equation 23}$$

When the first relative range measurement $d_{ij}$ is linearized into $\delta d_{ij}$, Equation 23 becomes Equation 24, which is:

$$d_{ij} = d_{ij} - \hat{d}_{ij} = \frac{({}^E \hat{R}_i - {}^E \hat{R}_j)^T}{\| {}^E \hat{R}_i - {}^E \hat{R}_j \|} (\delta R_i - \delta R_j) + v_{ij} \qquad \text{Equation 24}$$

where $\hat{d}_{ij}$ represents an estimate of the first relative range measurement, $\| {}^E \widehat{R_i} - {}^E \widehat{R_j} \|$ represents a vector magnitude, $\delta R_i$ represents a linearized position of the individual node 18*i*, and $\delta R_j$ represents a linearized position of the collaborative node 18*j*. If the first relative LOS measurement $^{B_i} u_{ij}$ is expressed in Equation 25 as:

$$^E u_{ij} = \frac{({}^E R_i - {}^E R_j)}{\| {}^E R_i - {}^E R_j \|} \qquad \text{Equation 25}$$

then the linearized first relative range measurement $\delta d_{ij}$ may be expressed in Equation 26 as:

$$\delta d_{ij} = {}^E u_{ij}^T \delta^E R_i - {}^E u_{ij}^T \delta^E R_j + v_{ij} \qquad \text{Equation 26}$$

Figure 6A:
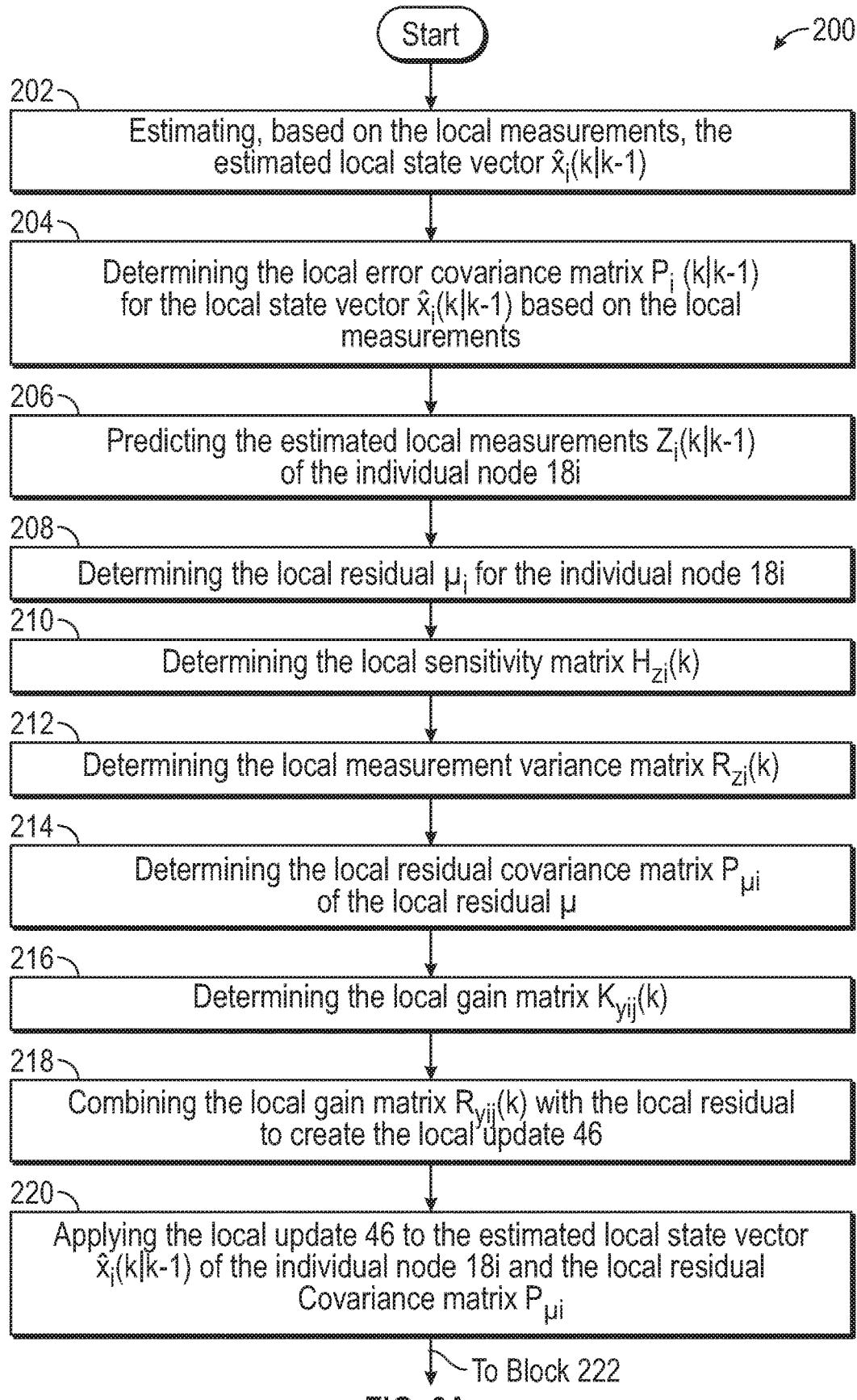
FIGS. 6A-6B illustrate a process flow diagram illustrating a method for determining updates for the estimated state vector of the individual node based on the LWIN approach, according to an exemplary embodiment.
Figure 6B:
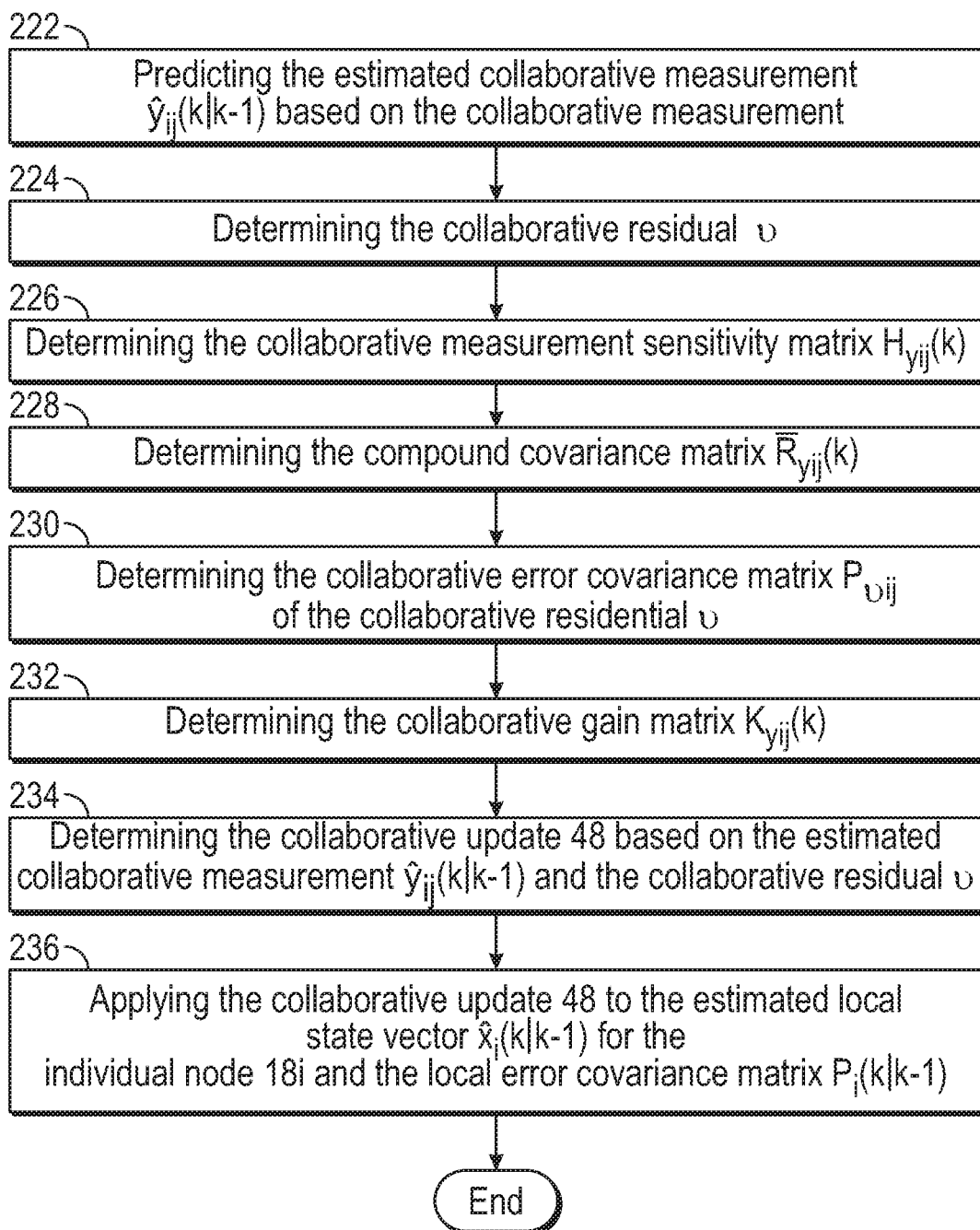

FIGS. 6A-6B illustrate an exemplary process flow diagram illustrating a method 200 for updating the estimated local state vector $\hat{x}_i(k|k-1)$ for the individual node 18*i*. Referring to FIGS. 2, 3, and 6A, the method 200 begins at block 202. In blocks 202-220, the estimator 40 determines the local update 46. Specifically, in block 202, the local state propagation block 60 estimates, based on the local measurements, the estimated local state vector $\hat{x}_i(k|k-1)$ for the individual node 18*i*. The method 200 may then proceed to block 204.

In block 204, the local error covariance block 62 determines the local error covariance matrix $P_i(k|k-1)$ for the estimated local state vector $\hat{x}_i(k|k-1)$ based on the local measurements. The local error covariance matrix $P_i(k|k-1)$ characterizes error of the estimated local state vector $\hat{x}_i(k|k-1)$. The method 200 may then proceed to block 206.

In block 206, the local measurement prediction block 64 predicts the estimated local measurement $\hat{z}_i(k|k-1)$ of the individual node 18$i$ based on the estimate of the local state vector $\hat{x}_i(k|k-1)$ and the local measurements, where the local residual $\mu_i$ for the individual node 18$i$ is associated with the estimated local measurement $\hat{z}_i(k|k-1)$. The method 200 may then proceed to block 208.

In block 208, the local residual block 66 determines the local residual $\mu_i$ for the individual node 18$i$. The local residual $\mu_i$ for the individual node 18$i$ represents the difference between the estimated local measurement $\hat{z}_i(k|k-1)$ and the local measurement vector $z_i(k)$. The method 200 may then proceed to block 210.

In block 210, the local measurement sensitivity block 68 determines the local measurement sensitivity matrix $H_{zi}(k)$, which represents an amount of change that the local measurements undergo based on a change in the local state vector $x_i(k)$. The method may then proceed to block 212.

In block 212, the local measurement sensitivity block 68 determines local measurement variance matrix $R_{zi}(k)$, which represents the uncertainty in the local measurements. The method 200 may then proceed to block 214.

In block 214, the local residual covariance matrix block 70 determines the local residual covariance matrix $P_{\mu_i}$ of the local residual $\mu_i$ based on the local error covariance matrix $P_i(k|k-1)$ and the local measurement variance matrix $R_{zi}(k)$. The method 200 may then proceed to block 216.

In block 216, the local gain matrix block 72 determines the local gain matrix $K_{zi}(k)$ based on the local residual covariance matrix $P_{\mu_i}$, the local error covariance matrix $P_i(k|k-1)$, and the local measurement sensitivity matrix $H_{zi}(k)$. The method 200 may then proceed to block 218.

In block 218, the local gain matrix block 72 combines the local gain matrix $K_{zi}(k)$ with the local residual $\mu_i$ to create the local update 46. The method 200 may then proceed to block 220.

In block 220, the local update 46 is applied to the estimated local state vector $\hat{x}_i(k|k-1)$ for the individual node 18$i$ and the local residual covariance matrix $P_{\mu_i}$. The method 200 may then proceed to block 222.

FIG. 6B illustrates blocks 222-238, where the estimator 40 determines the collaborative update 48. Specifically, in block 222, the collaborative measurement prediction block 80 predicts the estimated collaborative measurement $\hat{y}_{ij}(k|k-1)$ based on the collaborative measurement between the individual node 18$i$ and the collaborative node 18$j$, where the collaborative residual $\upsilon$ is associated with the estimated collaborative measurement $\hat{y}_{ij}(k|k-1)$. The method 200 may then proceed to block 224.

In block 224, the collaborative residual block 82 determines the collaborative residual $\upsilon$, which represents the difference between the collaborative measurement vector $y_{ij}(k)$ and the estimated collaborative measurement $\hat{y}_{ij}(k|k-1)$. The method 200 may then proceed to block 226.

In block 226, the collaborative measurement sensitivity block 84 determines the collaborative measurement sensitivity matrix $H_{yij}(k)$ representing the amount of change that the collaborative measurement undergoes based on a corresponding change in the local state vector $x_i(k)$ of the individual node 18$i$. The method 200 may then proceed to block 228.

In block 228, the collaborative measurement sensitivity block 84 also determines the compound covariance matrix $\overline{R}_{yij}(k)$ that characterizes the uncertainty in the collaborative measurement when an impact of one or more states of the collaborative node 18$j$ are modeled as random noise. The method 200 may then proceed to block 230.

In block 230, the collaborative covariance matrix block 86 determines the collaborative error covariance matrix $P_{\upsilon ij}$ of the collaborative residual $\upsilon$ based on at least the collaborative measurement sensitivity matrix $H_{yij}(k)$ and the compound covariance matrix $\overline{R}_{yij}(k)$. The method 200 may then proceed to block 232.

In block 232, the collaborative gain matrix block 88 determines the collaborative gain matrix $K_{yij}(k)$ based on the covariance matrix $P_{\upsilon ij}$ of the collaborative residual $\upsilon$. The method 200 may then proceed to block 234.

In block 234, the collaborative gain matrix block 88 determines the collaborative update 48, which is based on the estimated collaborative measurement $\hat{y}_{ij}(k|k-1)$ and the collaborative residual $\upsilon$. Specifically, the collaborative gain matrix $K_{yij}(k)$ is combined with the collaborative residual $\upsilon$ to create the collaborative update the collaborative update 48. The method 200 may then proceed to block 236.

In block 236, the collaborative update 48 is applied to the estimated local state vector $\hat{x}_i(k|k-1)$ for the individual node 18$i$. The method 200 may then terminate or return to block 202.

FIG. 7 is a schematic diagram of a plurality of nodes 18$i$, 18$j$, 18$k$, and 18$n$ that are in wireless communication with the centralized portion 100 of the estimator 140 based on the ITNS approach. In the non-limiting embodiment as shown in FIG. 7, the communication network 10 includes a distributed estimator 140, where a portion 98 of the estimator 140 is located at each node 18. Specifically, the portion 98 of the estimator 140 at each node 18 comprises of the local state propagation block 60, the local error covariance block 62, and the local residual block 66. The estimator 140 also includes the centralized portion 100, which is in wireless communication with all of the nodes 18 that are part of the communication network 10. However, in an alternative embodiment, the communication network 10 includes a plurality of centralized portions 100 that are in wireless communication with a sub-network or portion of the total nodes 18 that are part of the communication network 10. In the non-limiting embodiment as shown in FIG. 7, the centralized portion 100 of the estimator 140 is a stand-alone component. In other words, the centralized portion 100 of the estimator 140 is not part of any of the nodes 18. However, in an alternative embodiment, the centralized portion 100 of the estimator 140 is included with one of the plurality of nodes 18 of the communication network 10.

The communication network 10 includes one or more pairs of collaborating nodes 18$i$, 18$j$ as well. For example, in the non-limiting embodiment as shown, node 18$i$ and node 18$j$ are in wireless communication with one another and a collaborative measurement exists between the pair of collaborating nodes 18$i$, 18$j$. It is to be appreciated that FIG. 7 illustrates only one pair of collaborating nodes 18$i$, 18$j$ for purposes of simplicity and ease of illustration. Each node 18 that is part of the communication network 10 may collaborate with each remaining node 18 that is part of the communication network 10. In other words, if there are n number of nodes 18 that are part of the communication network 10, then there may be up to n*(n-1) pairs of collaborating nodes 18 that are included in the communication network 10.

Continuing to refer to FIG. 7, in the ITNS approach the plurality of nodes 18 each determine their own respective estimated local state vectors $\hat{x}(k|k-1)$, estimated local measurement $\hat{z}(k|k-1)$, and local residual $\mu$. In other words, each node 18 includes a respective local state propagation block 60, a respective local measurement prediction block 64, and a respective local residual block 66. Each node 18 sends its respective estimated local state vector $\hat{x}(k|k-1)$, respective estimated local measurement $\hat{z}(k|k-1)$, respective local residual µ, and respective local measurements to the centralized portion 100 of the estimator 140 over the communication network 10. The centralized portion 100 of the estimator 140 receives the respective estimated local state vector $\hat{x}(k|k-1)$, the respective estimated local measurement $\hat{z}(k|k-1)$, the respective local residual µ, and the local measurements from each of the plurality of nodes 18 that are part of the communication network 10. As explained below, the centralized portion 100 of the estimator 140 determines a local update 146 for each node 18 based on the respective estimated local state vector $\hat{x}(k|k-1)$, the respective estimated local measurement $\hat{z}(k|k-1)$, the respective local residual µ, and the respective local measurements. The centralized portion 100 of the estimator 140 also determines a collaborative update 148 for each pair of collaborating nodes 18$i$, 18$j$ that are part of the communication network 10.

FIG. 8 is a block diagram of the centralized portion 100 of the estimator 140. The centralized portion 100 of the estimator 140 includes a total error covariance block 162, a local measurement sensitivity block 168, a local residual covariance matrix block 170, and a local gain matrix block 172. The total error covariance block 162 determines a total error covariance matrix for the entire communication network 10 based on the respective estimated local state vector $\hat{x}(k|k-1)$ for each of the plurality of nodes 18 that are part of the communication network 10 (FIG. 7). The total error covariance matrix characterizes error for the entire communication network 10. That is, the total error covariance matrix characterizes the error based on the estimated local state vector $\hat{x}(k|k-1)$ for each node 18 that is part of the communication network 10. The total error covariance matrix is expressed in Equation 27 as:

$$P(k|k-1)=\Phi(k-1)P(k-1|k-1)\Phi^T(k-1)+Q(k) \quad \text{Equation 27}$$

where $P(k|k-1)$ is the total error covariance matrix when the time is equal to (k−1) based on measurements up to the point of (k−1), $P(k-1|k-1)$ is the covariance matrix for the entire communication network 10 when the time is equal to k based on measurements up to the point of (k−1), $\Phi$ is a state transition matrix for each node 18 in the communication network 10, $\Phi^T$ represents a transposed state transition matrix, and $Q(k)$ is a process noise covariance matrix for the entire communication network 10.

The local measurement sensitivity block 168 determines a respective local measurement sensitivity matrix $H_z(k)$ as well as a respective local measurement variance matrix $R_z(k)$ for a particular node 18 that is part of the communication network 10 (FIG. 7). As mentioned above, the respective local measurement sensitivity matrix $H_z(k)$ represents an amount of change that the local measurements for a particular node 18 undergo based on a change in the respective local state vector $x(k)$, and the respective local measurement variance matrix $R_z(k)$ represents an uncertainty in the local measurements for the particular node 18. The local residual covariance matrix block 170 of the estimator 140 determines a respective local residual covariance matrix $P_\mu$ for the particular node 18 based on the total error covariance matrix $P_i(k|k-1)$ for the entire communication network 10 and the local measurement variance matrix $R_{zi}(k)$, which is expressed in Equation 6 above.

The local gain matrix block 172 of the centralized portion 100 of the estimator 140 then determines the respective local gain matrix $K_z(k)$ for the particular node 18 based on the respective local residual covariance matrix $P_\mu$ for the particular node 18, the total error covariance matrix $P(k|k-1)$ for the entire communication network 10, and the respective local measurement sensitivity matrix $H_z(k)$ for the particular node 18. The respective local gain matrix $K_z(k)$ is combined with the local residual µ, to create the local update 146 for the particular node 18. Specifically, the local update 146 for a particular node 18 is a product of the respective local gain matrix $K_z(k)$ and the respective local residual p for each node 18 that is part of the communication network 10. Therefore, the local update 146 is determined based on the total error covariance matrix $P(k|k-1)$ for the entire communication network 10 and the local residual µ.

Referring to FIGS. 7 and 8, the local update 146 is applied to the estimated local state vector $\hat{x}(k|k-1)$ of the particular node 18 that is part of the communication network 10 to determine the corresponding updated estimated local state vector $\hat{x}_i(k|k)$. The local update 146 is also applied to the covariance matrix for the particular node 18. It is to be appreciated that the centralized portion 100 of the estimator 140 determines a unique local update 146 for each of the plurality of nodes 18 of the communication network 10. In other words, the centralized portion 100 of the estimator 140 is configured to determine an n number of local updates 146, where each local update 146 corresponds to a specific one of the nodes 18 that are part of the communication network 10.

The collaborative updates 148 are now described. There may be any number of pairs of collaborating nodes 18$i$, 18$j$ that are part of the communication network 10. Accordingly, there may be up to n*(n−1) number of collaborative updates 148 determined by the centralized portion 100 of the estimator 140. Furthermore, the centralized portion 100 of the estimator 140 may determine the collaborative updates 148 either immediately after the total error covariance block 162 determines the total error covariance matrix $P(k|k-1)$ or, alternatively, immediately after the local gain matrix block 172 applies the local update 146. However, if the centralized portion 100 of the estimator 140 determines the collaborative updates 148 after the local updates 146, then the total error covariance matrix $P(k|k-1)$ is updated first, and then the centralized portion 100 of the estimator 140 may determine the collaborative measurement.

For purposes for explanation, nodes 18$i$ and 18$j$ (FIG. 7) represent a collaborating pair of nodes. Specifically, the node 18$i$ represents the individual node that the collaborative measurement is taken with respect to, and the node 18$j$ represents the collaborative node. However, it is to be appreciated that each node 18 that is part of the communication network 10 may collaborate with each remaining node 18 that is part of the communication network 10 to determine the collaborative measurement. The centralized portion 100 of the estimator 140 includes a collaborative measurement block 176 and a collaborative update block 178. The collaborative measurement block 176 includes a collaborative measurement prediction block 180 and a collaborative residual block 182. The collaborative measurement prediction block 180 predicts the estimated collaborative measurement $\hat{y}_{ij}(k|k-1)$ based on the collaborative measurement vector $y_{ij}(k)$ and the local state vectors $x_i(k)$, $y_j(k)$ of the collaborating nodes 18$i$, 18$j$, and is expressed by Equation 10 above. The collaborative residual υ, which is associated with the estimated collaborative measurement $\hat{y}_{ij}(k|k-1)$, represents the difference between the collaborative measurement and the estimated collaborative measurement $\hat{y}_{ij}$ (k|k−1), and is determined based on Equation 11 above.

The collaborative update block 178 includes a collaborative measurement sensitivity block 184, a collaborative covariance matrix block 186, and a collaborative gain matrix block 188. The collaborative measurement sensitivity block 184 determines the collaborative measurement sensitivity matrix $H_{yij}(k)$ and the compound covariance matrix $\bar{R}_{yij}(k)$. The collaborative measurement sensitivity matrix $H_{yij}(k)$ represents an amount of change that the collaborative measurement undergoes based on a corresponding change in the local state vector $x_i(k)$ of the node 18i that the collaborative measurement is taken with respect to. The compound covariance matrix $\bar{R}_{yij}(k)$ characterizes an uncertainty in the collaborative measurement when an impact of one or more states of the collaborative node 18j of the pair of collaborating nodes 18i, 18j are modeled as random noise. The collaborative measurement sensitivity matrix $H_{yij}(k)$ is expressed in Equation 12 above, and the compound covariance matrix $\bar{R}_{yij}(k)$ is expressed in Equation 13 above.

The collaborative covariance matrix block 186 determines the collaborative error covariance matrix $P_{υij}$ of the collaborative residual υ, and is determined based on Equation 14 above. The collaborative gain matrix block 188 determines the collaborative gain matrix $K_{yij}(k)$ based on the collaborative error covariance matrix $P_{υij}$ of the collaborative residual υ. The collaborative gain matrix $K_{yij}(k)$ is determined based on Equation 15 above. The collaborative gain matrix $K_{yij}(k)$ is combined with the collaborative residual υ to create the collaborative update 148 for the pair of collaborating nodes 18i, 18j. Specifically, the collaborative update 148 is a product of the collaborative gain matrix $K_{yij}(k)$ and the collaborative residual υ. Referring to both FIGS. 7 and 8, the collaborative update 48 is applied to the to the respective estimated local state vectors $\hat{x}_i(k|k-1)$, $\hat{x}_j(k|k-1)$ for both nodes 18i, 18j of the pair of collaborating nodes. The collaborative update 148 is also applied to the total error covariance matrix P(k|k−1) of the communication network 10.

In one embodiment, the communication network 10 including the centralized portion 100 of the estimator 140 is part of a PNT network 26 (FIG. 4). Accordingly, in the embodiment as shown in FIG. 5A, the collaborative measurement between the individual node 18i and the collaborative node 18j includes relative distance measurements between the individual node 18i and the collaborative node 18j combined with relative LOS measurements between the individual node 18i and the collaborative node 18j. As mentioned above, the relative distance measurements are represented by the first relative distance $r_{ij}$ measured between the individual node 18i and the collaborative node 18j as measured by individual node 18i, and the second relative distance $r_{ji}$ measured between the individual node 18i and the collaborative node 18j as measured by the collaborative node 18j. The relative LOS measurements include a first relative LOS measurement $^{B_i}u_{ij}$ as measured by the individual node 18i is represented by a first unit vector pointing from the individual node 18i to the collaborative node 18j. The relative LOS measurements further include a second relative LOS measurement $^{B_j}u_{ji}$ as measured by the collaborative node 18j is represented by a second unit vector pointing from the collaborative node 18j to the individual node 18i.

Referring to FIG. 5B, in another embodiment the collaborative measurement between the individual node 18i and the collaborative node 18j is the relative LOS direction measurement that indicates an angular measurement as measured with respect to either the individual node 18i or the collaborative node 18j. In one example, the collaborative measurements include the position $^E R_i$ of the individual node 18i, the attitude $r^{Bi}$ of the individual node 18i in the body frame of reference, and the first relative LOS direction measurement $u_{ij}$ Equation 28 may be used to determine the attitude $r^{Bi}$ and the position $^E R_i$ of the individual node 18i, and is expressed as:

$$z_{ij} = r^{Bi} u_{ij} = C_E^{Bi}(^E R_j - ^E R_i) + v_{ij} \qquad \text{Equation 28}$$

where $z_{ij}$ represents a measurement for the individual node 18i through a collaboration between the individual node 18i. In another example, the collaborative measurements include the position $^E R_j$ of the collaborative node 18j, the attitude $r^{Bj}$ of the collaborative node 18j in the body frame of reference, and the second relative LOS direction measurement $u_{ji}$. Equation 29 may be used to determine the attitude $r^{Bi}$ and the position $^E R_i$ of the individual node 18i, and is expressed as:

$$z_{ji} = r^{Bj} u_{ji} = C_E^{Bj}(^E R_i - ^E R_j) + v_{ji} \qquad \text{Equation 29}$$

where $z_{ij}$ represents a measurement for the collaborative node 18j through a collaboration between the collaborative node 18j and the individual node 18i, and $v_{ij}$ represents all measurement noise.

In yet another embodiment as shown in FIG. 5C, the collaborative measurement is the relative range measurement between the individual node 18i and the collaborative node 18j, which is measured with respect to either the individual node 18i or the collaborative node 18j. Specifically, FIG. 5C illustrates the first relative range measurement $d_{ij}$ measured between the individual node 18i and the collaborative node 18j as measured with respect to the individual node 18i and the second relative range measurement $d_{ji}$ measured between the individual node 18i and the collaborative node 18j as measured with respect to the collaborative node 18j.

Figure 9A:
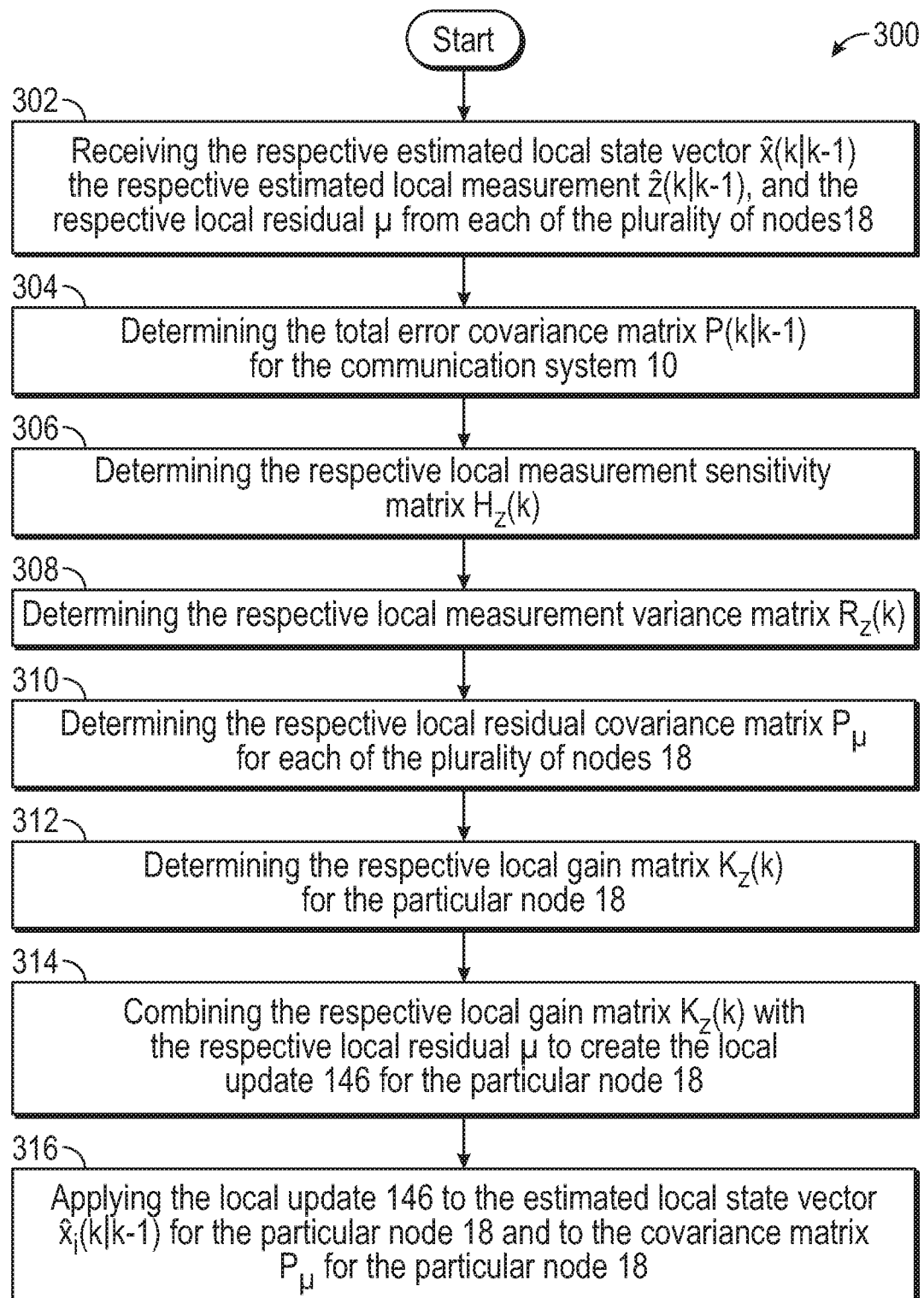
FIGS. 9A-9B illustrate a process flow diagram illustrating a method for determining updates for the estimated state vector of the individual node based on the ITNS approach, according to an exemplary embodiment.
Figure 9B:
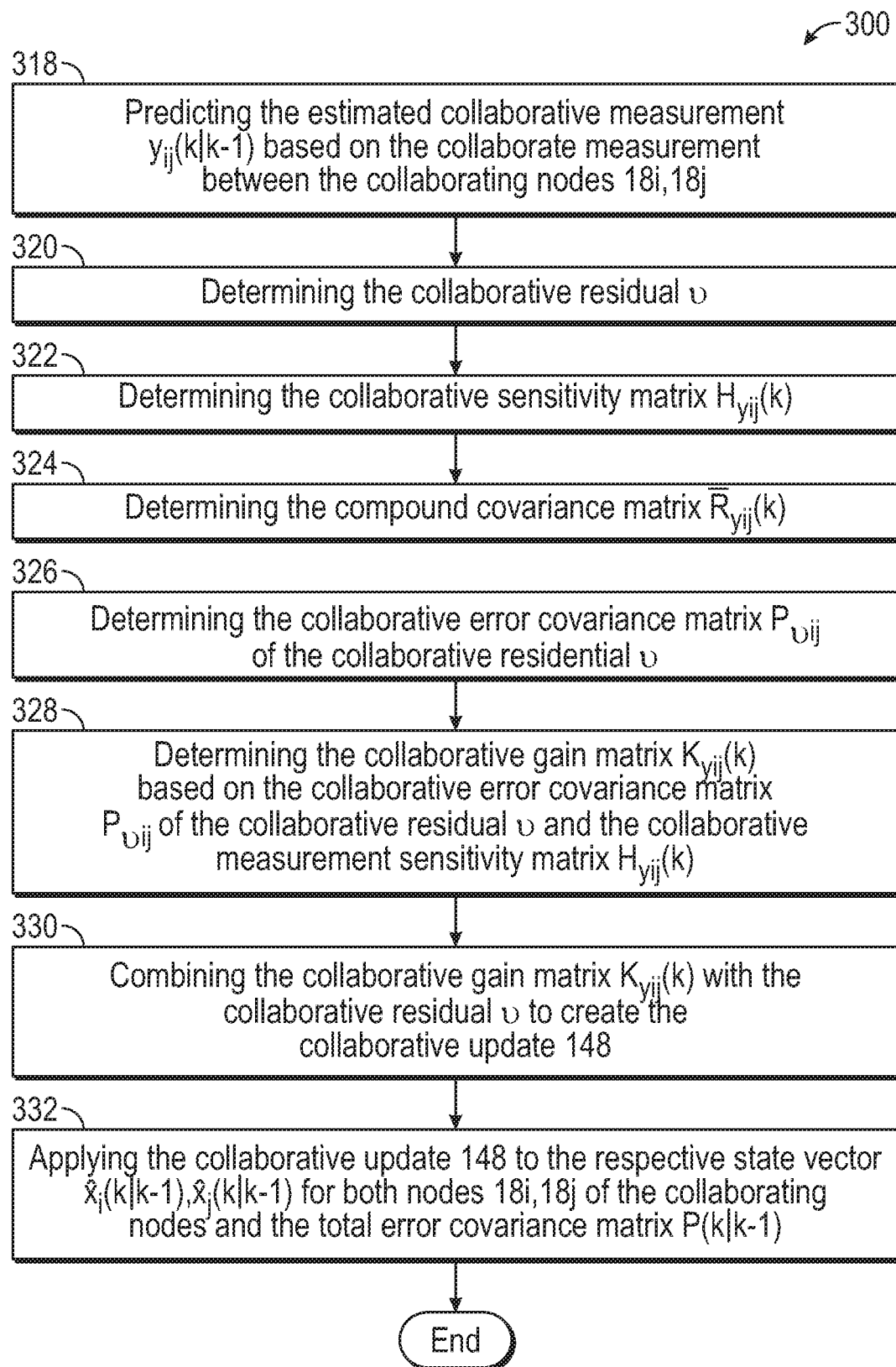

FIGS. 9A-9B illustrate an exemplary process flow diagram illustrating a method 300 for updating the estimated local state vector for the plurality of nodes 18 that are part of the communication network 10. Referring to FIGS. 7, 8, and 9A, the method 300 begins at block 302. In blocks 302-316, the centralized portion 100 of the estimator 140 determines the local update 146. Specifically, in block 202, the centralized portion 100 of the estimator 140 receives the respective estimated local state vector $\hat{x}(k|k-1)$, the respective estimated local measurement $\hat{z}(k|k-1)$, and the respective local residual μ from each of the plurality of nodes 18 that are part of the communication network. The method 300 may then proceed to block 304.

In block 304, the total error covariance block 162 of the centralized portion 100 of the estimator 140 determines the total error covariance matrix P(k|k−1) for the communication network 10 based on the respective estimated local state vector $\hat{x}(k|k-1)$ for each of the plurality of nodes 18 that are part of the communication network 10. The method 300 may then proceed to block 306.

In block 306, the local measurement sensitivity block 168 determines the respective local measurement sensitivity matrix $H_z(k)$, which represents an amount of change that the local measurements for the particular node 18 undergo based on a change in the respective local state vector x(k). The method 300 may then proceed to block 308.

In block 308, the local measurement sensitivity block 168 determines the respective local measurement variance matrix $R_z(k)$, which represents the uncertainty in the local measurements for the particular node 18. The method 300 may then proceed to block 310.

In block 310, the local residual covariance matrix block 170 determines the respective local residual covariance matrix $P_\mu$ for each of the plurality of nodes 18 that are part of the communication network 10 based on the total error covariance matrix $P(k|k-1)$ for the entire communication network 10 and the respective local measurement variance matrix $R_z(k)$. The method 300 may then proceed to block 312.

In block 312, the local gain matrix block 172 determines the respective local gain matrix $K_z(k)$ for the particular node 18 based on the respective local residual covariance matrix $P_\mu$ for the particular node 18, the total error covariance matrix $P(k|k-1)$ for the entire communication network 10, and the respective local measurement sensitivity matrix $H_z(k)$ for the particular node 18. The method 300 may then proceed to block 314.

In block 314, the collaborative update block 178 combines the local gain matrix $K_z(k)$ with the respective local residual $\mu$ of the particular node 18 to create the respective local update 146 for the particular node 18. Specifically, the local update 146 for a particular node 18 is the product of the respective local gain matrix $K_z(k)$ and the respective local residual $\mu$ for each node 18 that is part of the communication network 10. The method 300 may then proceed to block 316.

In block 316, the local update 146 is applied to the estimated local state vector $\hat{x}(k|k-1)$ of the particular node 18 that is part of the communication network 10 to determine the corresponding updated estimated local state vector $\hat{x}_i(k|k)$. The local update 146 is also applied to the collaborative error covariance matrix $P_\mu$ for the particular node 18. The method 300 may then proceed to block 318.

FIG. 9B illustrates blocks 318-332, where the collaborative update 148 is determined. Specifically, in block 318, the collaborative measurement prediction block 180 predicts the estimated collaborative measurement $\hat{y}_{ij}(k|k-1)$ based on the collaborative measurement between the pair of collaborating nodes 18i, 18j that are part of the communication network 10, where the collaborative residual is associated with the estimated collaborative measurement. Specifically, as mentioned above, the estimated collaborative measurement $\hat{y}_{ij}(k|k-1)$ based on the collaborative measurement vector $y_{ij}(k)$ and the local state vectors $x_i(k)$, $y_i(k)$ of the collaborating nodes 18i, 18j. The method 300 may then proceed to block 320.

In block 320, the collaborative residual block 182 determines the collaborative residual $\upsilon$, which represents the difference between the collaborative measurement vector $y_{ij}(k)$ and the estimated collaborative measurement $\hat{y}_{ij}(k|k-1)$. The method 300 may then proceed to block 322.

In block 322, the collaborative measurement sensitivity block 184 determine the collaborative measurement sensitivity matrix $H_{y_{ij}}(k)$, which represents the amount of change that the collaborative measurement undergoes based on a corresponding change in the local state vector $x_i(k)$ of the node 18i that the collaborative measurement is taken with respect to. The method 300 may then proceed to block 324.

In block 324, the collaborative measurement sensitivity block 184 determine the compound covariance matrix $\overline{R}_{y_{ij}}(k)$ characterizes an uncertainty in the collaborative measurement when an impact of one or more states of the collaborative node 18j of the pair of collaborating nodes 18i, 18j are modeled as random noise. The method 300 may then proceed to block 326.

In block 326, the collaborative covariance matrix block 186 determines the collaborative error covariance matrix $P_{\upsilon_{ij}}$ of the collaborative residual $\upsilon$ based on at least the collaborative measurement sensitivity matrix $H_{y_{ij}}(k)$ and the compound covariance matrix $\overline{R}_{y_{ij}}(k)$. The method 300 may then proceed to block 328.

In block 328, the collaborative gain matrix block 188 determines the collaborative gain matrix $K_{y_{ij}}(k)$ based on the collaborative error covariance matrix $P_{\upsilon_{ij}}$ of the collaborative residual $\upsilon$ and the collaborative measurement sensitivity matrix $H_{y_{ij}}(k)$. The method 300 may then proceed to block 330.

In block 330, the collaborative gain matrix block 188 combines the collaborative gain matrix $K_{y_{ij}}(k)$ with the collaborative residual $\upsilon$ to create the collaborative update 148. Thus, it is to be appreciated that the collaborative update 148 is determined based on the estimated collaborative measurement $\hat{y}_{ij}(k|k-1)$ and the collaborative residual estimated collaborative measurement $\hat{y}_{ij}(k|k-1)$. The method 300 may then proceed to block 332.

In block 332, the collaborative update 148 is applied to the respective the estimated local state vectors $\hat{x}_i(k|k-1)$, $\hat{x}_j(k|k-1)$ for both nodes 18i, 18j of the pair of collaborating nodes. The collaborative update 148 is also applied to the total error covariance matrix $P(k|k-1)$ of the communication network 10. The method 300 may then terminate or return to block 302 (shown in FIG. 9A).

Referring generally to the figures, the present disclosure provides various technical effects and benefits. Specifically, the present disclosure describes an estimator that determines local updates as well as collaborative updates that are applied to the estimated local state vector for an individual node. The local updates are determined based on local measurements, while the collaborative updates are based on collaborative measurements between the individual node and a collaborative node. In one decentralized approach, the estimator may be included as part of each node that is part of the communication network. This approach may require less computational power when compared to the centralized approach. Alternatively, in another approach, the estimation is done at a centralized location, which may result in improved accuracy. However, this approach may require additional computational power when compared to the decentralized approach. Both the centralized and the decentralized approaches may improve the accuracy of the estimated local state vector for each node, since the updates are based on not only the local measurements, but also collaborative measurements between nodes.

Figure 10:
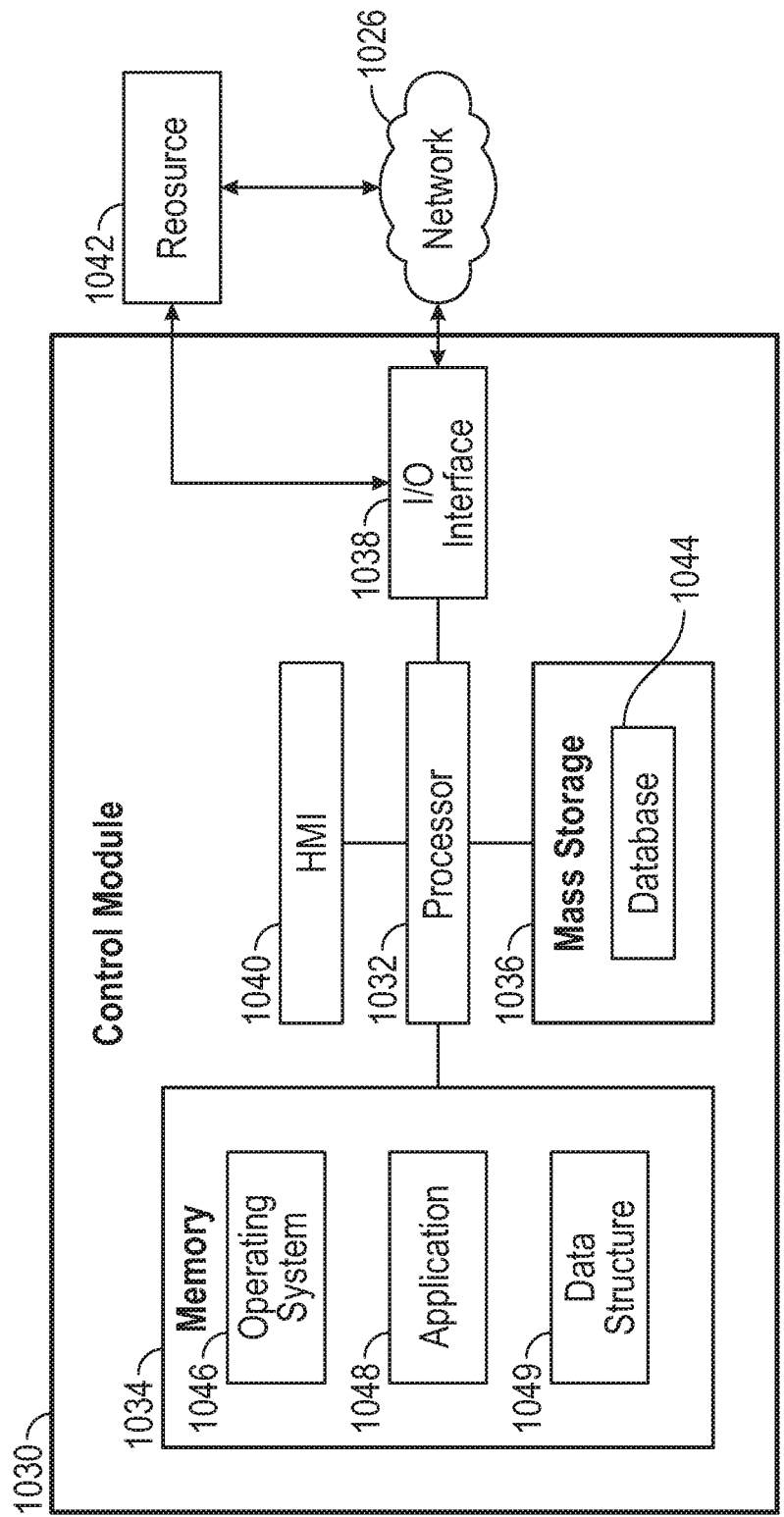
FIG. 10 is the computing system for the disclosed estimator, according to an exemplary embodiment.

Referring to FIG. 10, the computing system 30 (FIG. 2) and the centralized portion 100 of the estimator 140 (FIG. 7) are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A communication network having a plurality of nodes, wherein an individual node of the communication network comprises:
    a measurement device configured to collect local measurements;
    an antenna configured to wirelessly connect the individual node to a collaborating node that is part of the communication network;
    one or more processors in electronic communication with the measurement device and the antenna;
    a memory coupled to the one or more processors, the memory storing data into a database and program code that, when executed by the one or more processors, causes the individual node to:
        estimate, based on the local measurements, an estimated local state vector for the individual node;
        predict an estimated local measurement of the individual node on based on the estimated local state vector and the local measurements, wherein a local residual is associated with the estimated local measurement;
        determine a local update based on the estimated local measurement and the local residual, wherein the local update is applied to the estimated local state vector for the individual node;
        predict an estimated collaborative measurement based on a collaborative measurement between the individual node and the collaborative node, wherein a collaborative residual is associated with the estimated collaborative measurement; and
        determine a collaborative update based on the estimated collaborative measurement and the collaborative residual, wherein the collaborative update is applied to the estimated local state vector for the individual node.

2. The communication network of claim 1, wherein the one or more processors execute instructions to:
    predict the estimated collaborative measurement between the individual node and the collaborative node based on a collaborative measurement vector, a local state vector of the individual node, and a local state vector of the collaborative node.

3. The communication network of claim 2, wherein the collaborative residual represents a difference between the collaborative measurement vector and the estimated collaborative measurement.

4. The communication network of claim 1, wherein the one or more processors execute instructions to:
    determine a collaborative measurement sensitivity matrix representing an amount of change that the collaborative measurement undergoes based on a corresponding change in a local state vector of the individual node;
    determine a compound covariance matrix that characterizes an uncertainty in the collaborative measurement when an impact of one or more states of the collaborative node are modeled as random noise; and determine a collaborative error covariance matrix of the collaborative residual based on at least the collaborative measurement sensitivity matrix and the compound covariance matrix.

5. The communication network of claim 4, wherein the one or more processors execute instructions to:
determine collaborative gain matrix based on the collaborative error covariance matrix of the collaborative residual and the collaborative measurement sensitivity matrix; and
combine the collaborative gain matrix with the collaborative residual to create the collaborative update.

6. The communication network of claim 5, wherein the collaborative update is a product of the collaborative gain matrix and the collaborative residual.

7. The communication network of claim 1, wherein the one or more processors execute instructions to:
determine a local error covariance matrix for the estimated local state vector based on the local measurements, wherein the local error covariance matrix characterizes error of the estimated local state vector.

8. The communication network of claim 7, wherein the one or more processors execute instructions to:
determine a local measurement sensitivity matrix representing an amount of change that the local measurements undergo based on a corresponding change in a local state vector;
determine a local measurement variance matrix represents an uncertainty in the local measurements; and
determine a local residual covariance matrix based on the local error covariance matrix and the local measurement variance matrix.

9. The communication network of claim 8, wherein the one or more processors execute instructions to:
determine a local gain matrix based on the local residual covariance matrix, the local error covariance matrix, and the local measurement sensitivity matrix; and
combine the local gain matrix with the local residual to create the local update.

10. The communication network of claim 9, wherein the local update is a product of the local gain matrix and the local residual.

11. The communication network of claim 1, wherein the local residual for the individual node represents a difference between the estimated local measurement and a local measurement vector.

12. The communication network of claim 1, wherein the measurement device of the individual node is a collaborative positioning, navigation, and timing (PNT) system.

13. The communication network of claim 12, wherein the collaborative measurement between the individual node and the collaborative node includes relative distance measurements between the individual node and the collaborative node combined with relative line-of-sight (LOS) measurements between the individual node and the collaborative node.

14. The communication network of claim 13, wherein the relative distance measurements are represented by a first relative distance measured between the individual node and the collaborative node as measured by individual node, and a second relative distance measured between the individual node and the collaborative node as measured by the collaborative node.

15. The communication network of claim 13, wherein the relative LOS measurements include:
a first relative LOS measurement represented by a first unit vector pointing from the individual node to the collaborative node, wherein the first relative LOS measurement is measured by the individual node; and
a second relative LOS measurement represented by a second unit vector pointing from the collaborative node to the individual node, wherein the second relative LOS measurement is measured by the collaborative node.

16. The communication network of claim 12, wherein the collaborative measurement includes a first relative range measurement measured between the individual node and the collaborative node as measured with respect to the individual node and a second relative range measurement measured between the individual node and the collaborative node as measured with respect to the collaborative node.

17. A method for updating an estimated local state vector of an individual node, the method comprising:
estimating, based on local measurements collected by a measurement device of the individual node, an estimated local state vector for the individual node, wherein the individual node is part of a communication network having a plurality of nodes;
determining, by an estimator of the individual node, a local error covariance matrix for the estimated local state vector based on the local measurements, wherein the local error covariance matrix characterizes error of the estimated local state vector;
predicting, by the estimator of the individual node, an estimated local measurement of the individual node on based on the estimated local state vector and the local measurements;
determining, by the estimator of the individual node, a local residual associated with the estimated local measurement;
determining, by the estimator of the individual node, a local measurement sensitivity matrix representing an amount of change that the local measurements undergo based on a corresponding change in a local state vector;
determining, by the estimator of the individual node, a local measurement variance matrix represents an uncertainty in the local measurements;
determining, by the estimator of the individual node, a local residual covariance matrix based on the local error covariance matrix and the local measurement variance matrix;
determining, by the estimator of the individual node, a local gain matrix based on the local residual covariance matrix, the local error covariance matrix, and the local measurement sensitivity matrix;
combine the local gain matrix with the local residual to create the local update;
applying the local update to the estimated local state vector of the individual node and the local residual covariance matrix;
predicting, by the estimator of the individual node, an estimated collaborative measurement based on a collaborative measurement between the individual node and a collaborative node, wherein the collaborating node is part of the communication network and is in wireless communication with the individual node;
determining, by the estimator of the individual node, a collaborative residual associated with the estimated collaborative measurement;
determining, by the estimator of the individual node, a collaborative measurement sensitivity matrix representing an amount of change that the collaborative measurement undergoes based on a corresponding change in a local state vector of the individual node;

determining, by the estimator of the individual node, a compound covariance matrix that characterizes an uncertainty in the collaborative measurement when an impact of one or more states of the collaborative node are modeled as random noise;

determining, by the estimator of the individual node, a collaborative error covariance matrix of the collaborative residual based on at least the collaborative measurement sensitivity matrix and the compound covariance matrix;

determining, by the estimator of the individual node, a collaborative gain matrix based on the collaborative error covariance matrix of the collaborative residual; and combining the collaborative gain matrix with the collaborative residual to create a collaborative update.

18. The method of claim 17, further comprising:

applying the collaborative update to the estimated local state vector for the individual node.

19. The method of claim 18, further comprising:

applying the collaborative update to the local residual covariance matrix for the individual node.

20. The method of claim 17, wherein the collaborative residual represents a difference between a collaborative measurement vector and the estimated collaborative measurement.

* * * * *